(12) United States Patent
Cooper et al.

(10) Patent No.: US 12,544,222 B2
(45) Date of Patent: Feb. 10, 2026

(54) GUIDE WIRE APPARATUSES AND METHODS

(71) Applicant: Edwards Lifesciences Corporation, Irvine, CA (US)

(72) Inventors: Alexander H. Cooper, Costa Mesa, CA (US); Jeremy Brent Ratz, Winchester, MA (US); Kevin M. Stewart, Powell, TN (US); David Robert Landon, Huntington Beach, CA (US); Garrett Dallas Johnson, Costa Mesa, CA (US); Harish Manickam Srinimukesh, Costa Mesa, CA (US); Deena Jamal Malaeb, San Ramon, CA (US)

(73) Assignee: Edwards Lifesciences Corporation, Irvine, CA (US)

( * ) Notice: Subject to any disclaimer, the term of this patent is extended or adjusted under 35 U.S.C. 154(b) by 986 days.

(21) Appl. No.: 17/390,762

(22) Filed: Jul. 30, 2021

(65) Prior Publication Data

US 2021/0386544 A1   Dec. 16, 2021

Related U.S. Application Data

(63) Continuation of application No. PCT/US2020/012585, filed on Jan. 7, 2020.
(Continued)

(51) Int. Cl.
*A61F 2/24*   (2006.01)

(52) U.S. Cl.
CPC .... *A61F 2/2427* (2013.01); *A61F 2210/0014* (2013.01); *A61F 2230/0006* (2013.01);
(Continued)

(58) Field of Classification Search
CPC ............ A61F 2/2427; A61F 2210/0014; A61F 2230/0006; A61F 2230/0067;
(Continued)

(56) References Cited

U.S. PATENT DOCUMENTS 3,409,013 A   11/1968   Henry
3,472,230 A   10/1969   Fogarty
(Continued)

FOREIGN PATENT DOCUMENTS

CA   2304325 C   5/2008
DE   2246526 C3   7/1981
(Continued)

OTHER PUBLICATIONS

Andersen H.R., etal., "Transluminal Implantation of Artificial Heart Valves. Description of a New Expandable Aortic Valve and Initial Results with Implantation by Catheter Technique in Closed Chest Pigs," European Heart Journal, The European Society of Cardiology, Oxford University Press, United Kingdom, May 1, 1992, vol. 13, No. 5, pp. 704-708.
(Continued)

*Primary Examiner* — Jerrah Edwards
*Assistant Examiner* — Kia Xiong White
(74) *Attorney, Agent, or Firm* — Thomas C. Richardson

(57) ABSTRACT

Guide wire apparatuses and methods. Guide wires may be utilized for guiding a delivery apparatus, for example a transcatheter mitral valve delivery apparatus to replace a native mitral valve. A guide wire may include a core body having a length, and an outer layer having a length and extending around the core body and along the length of the core body. A guide wire may include an intermediate layer positioned between the core body and the outer layer and
(Continued)

configured to be retracted relative to the core body and the outer layer along the length of the core body and the length of the outer layer.

20 Claims, 23 Drawing Sheets

Related U.S. Application Data

(60) Provisional application No. 62/800,980, filed on Feb. 4, 2019.

(52) U.S. Cl.
CPC ............... A61F 2230/0067 (2013.01); A61F 2230/0071 (2013.01); A61F 2230/0091 (2013.01)

(58) Field of Classification Search
CPC .... A61F 2230/0071; A61F 2230/0091; A61M 2025/09083; A61M 2025/0915; A61M 25/09033; A61M 25/09025
See application file for complete search history.

(56) References Cited

U.S. PATENT DOCUMENTS

| | | |
|---|---|---|
| 3,548,417 A | 12/1970 | Kischer et al. |
| 3,587,115 A | 6/1971 | Shiley |
| 3,657,744 A | 4/1972 | Ersek |
| 3,671,979 A | 6/1972 | Moulopoulos |
| 3,714,671 A | 2/1973 | Goodenough et al. |
| 3,739,402 A | 6/1973 | Kahn et al. |
| 3,755,823 A | 9/1973 | Hancock |
| 4,011,947 A | 3/1977 | Sawyer |
| 4,035,849 A | 7/1977 | Angell et al. |
| 4,056,854 A | 11/1977 | Boretos et al. |
| 4,079,468 A | 3/1978 | Liotta et al. |
| 4,106,129 A | 8/1978 | Carpentier et al. |
| 4,204,283 A | 5/1980 | Bellhouse et al. |
| 4,222,126 A | 9/1980 | Boretos et al. |
| 4,265,694 A | 5/1981 | Boretos et al. |
| 4,297,749 A | 11/1981 | Davis et al. |
| 4,339,831 A | 7/1982 | Johnson |
| 4,340,977 A | 7/1982 | Brownlee et al. |
| 4,343,048 A | 8/1982 | Ross et al. |
| 4,345,340 A | 8/1982 | Rosen |
| 4,373,216 A | 2/1983 | Klawitter |
| 4,406,022 A | 9/1983 | Roy |
| 4,470,157 A | 9/1984 | Love |
| 4,477,930 A | 10/1984 | Totten et al. |
| 4,490,859 A | 1/1985 | Black et al. |
| 4,535,483 A | 8/1985 | Klawitter et al. |
| 4,553,545 A | 11/1985 | Maass et al. |
| 4,574,803 A | 3/1986 | Storz |
| 4,592,340 A | 6/1986 | Boyles |
| 4,605,407 A | 8/1986 | Black et al. |
| 4,612,011 A | 9/1986 | Kautzky |
| 4,643,732 A | 2/1987 | Pietsch et al. |
| 4,655,771 A | 4/1987 | Wallsten |
| 4,692,164 A | 9/1987 | Dzemeshkevich et al. |
| 4,733,665 A | 3/1988 | Palmaz |
| 4,759,758 A | 7/1988 | Gabbay |
| 4,762,128 A | 8/1988 | Rosenbluth |
| 4,777,951 A | 10/1988 | Cribier et al. |
| 4,787,899 A | 11/1988 | Lazarus |
| 4,787,901 A | 11/1988 | Baykut |
| 4,796,629 A | 1/1989 | Grayzel |
| 4,829,990 A | 5/1989 | Thuroff et al. |
| 4,851,001 A | 7/1989 | Taheri |
| 4,856,516 A | 8/1989 | Hillstead |
| 4,865,600 A | 9/1989 | Carpentier et al. |
| 4,878,495 A | 11/1989 | Grayzel |
| 4,878,906 A | 11/1989 | Lindemann et al. |
| 4,883,458 A | 11/1989 | Shiber |
| 4,922,905 A | 5/1990 | Strecker |
| 4,966,604 A | 10/1990 | Reiss |
| 4,979,939 A | 12/1990 | Shiber |
| 4,986,830 A | 1/1991 | Owens et al. |
| 4,994,077 A | 2/1991 | Dobben |
| 5,007,896 A | 4/1991 | Shiber |
| 5,026,366 A | 6/1991 | Leckrone |
| 5,032,128 A | 7/1991 | Alonso |
| 5,037,434 A | 8/1991 | Lane |
| 5,047,041 A | 9/1991 | Samuels |
| 5,059,177 A | 10/1991 | Towne et al. |
| 5,080,668 A | 1/1992 | Bolz et al. |
| 5,085,635 A | 2/1992 | Cragg |
| 5,089,015 A | 2/1992 | Ross |
| 5,108,370 A | 4/1992 | Walinsky |
| 5,152,771 A | 10/1992 | Sabbaghian et al. |
| 5,163,953 A | 11/1992 | Vince |
| 5,167,628 A | 12/1992 | Boyles |
| 5,192,297 A | 3/1993 | Hull |
| 5,232,446 A | 8/1993 | Arney |
| 5,266,073 A | 11/1993 | Wall |
| 5,282,847 A | 2/1994 | Trescony et al. |
| 5,326,371 A | 7/1994 | Love et al. |
| 5,332,402 A | 7/1994 | Teitelbaum |
| 5,360,444 A | 11/1994 | Kusuhara |
| 5,397,351 A | 3/1995 | Pavcnik et al. |
| 5,411,055 A | 5/1995 | Kane |
| 5,411,522 A | 5/1995 | Trott |
| 5,411,552 A | 5/1995 | Andersen et al. |
| 5,415,667 A | 5/1995 | Frater |
| 5,480,424 A | 1/1996 | Cox |
| 5,500,014 A | 3/1996 | Quijano et al. |
| 5,545,209 A | 8/1996 | Roberts et al. |
| 5,549,665 A | 8/1996 | Vesely et al. |
| 5,554,185 A | 9/1996 | Block et al. |
| 5,571,175 A | 11/1996 | Vanney et al. |
| 5,591,185 A | 1/1997 | Kilmer et al. |
| 5,599,305 A | 2/1997 | Hermann et al. |
| 5,607,464 A | 3/1997 | Trescony et al. |
| 5,609,626 A | 3/1997 | Quijano et al. |
| 5,639,274 A | 6/1997 | Fischell et al. |
| 5,665,115 A | 9/1997 | Cragg |
| 5,697,382 A | 12/1997 | Love et al. |
| 5,716,417 A | 2/1998 | Girard et al. |
| 5,728,068 A | 3/1998 | Leone et al. |
| 5,749,890 A | 5/1998 | Shaknovich |
| 5,756,476 A | 5/1998 | Epstein et al. |
| 5,769,812 A | 6/1998 | Stevens et al. |
| 5,800,508 A | 9/1998 | Goicoechea et al. |
| 5,855,597 A | 1/1999 | Jayaraman |
| 5,855,601 A | 1/1999 | Bessler et al. |
| 5,855,602 A | 1/1999 | Angell |
| 5,906,619 A | 5/1999 | Olson et al. |
| 5,925,063 A | 7/1999 | Khosravi |
| 5,957,949 A | 9/1999 | Leonhardt et al. |
| 5,968,068 A | 10/1999 | Dehdashtian et al. |
| 6,027,525 A | 2/2000 | Suh et al. |
| 6,042,607 A | 3/2000 | Williamson, IV et al. |
| 6,086,612 A | 7/2000 | Jansen |
| 6,113,631 A | 9/2000 | Jansen |
| 6,132,473 A | 10/2000 | Williams et al. |
| 6,171,335 B1 | 1/2001 | Wheatley et al. |
| 6,174,327 B1 | 1/2001 | Mertens et al. |
| 6,210,408 B1 | 4/2001 | Chandrasekaran et al. |
| 6,217,585 B1 | 4/2001 | Houser et al. |
| 6,221,091 B1 | 4/2001 | Khosravi |
| 6,231,602 B1 | 5/2001 | Carpentier et al. |
| 6,245,040 B1 | 6/2001 | Inderbitzen et al. |
| 6,245,102 B1 | 6/2001 | Jayaraman |
| 6,251,093 B1 | 6/2001 | Valley et al. |
| 6,287,339 B1 | 9/2001 | Vazquez et al. |
| 6,299,637 B1 | 10/2001 | Shaolian et al. |
| 6,302,906 B1 | 10/2001 | Goicoechea et al. |
| 6,306,141 B1 | 10/2001 | Jervis |
| 6,312,465 B1 | 11/2001 | Griffin et al. |
| 6,338,740 B1 | 1/2002 | Carpentier |
| 6,350,277 B1 | 2/2002 | Kocur |
| 6,358,277 B1 | 3/2002 | Duran |

(56) References Cited

U.S. PATENT DOCUMENTS

| | | |
|---|---|---|
| 6,461,382 B1 | 10/2002 | Cao |
| 6,468,660 B2 | 10/2002 | Ogle et al. |
| 6,482,228 B1 | 11/2002 | Norred |
| 6,488,704 B1 | 12/2002 | Connelly et al. |
| 6,527,800 B1 | 3/2003 | McGuckin, Jr. et al. |
| 6,527,979 B2 | 3/2003 | Constantz et al. |
| 6,540,782 B1 | 4/2003 | Snyders |
| 6,575,959 B1 | 6/2003 | Sarge et al. |
| 6,605,112 B1 | 8/2003 | Moll et al. |
| 6,610,088 B1 | 8/2003 | Gabbay |
| 6,629,534 B1 | 10/2003 | St. et al. |
| 6,676,698 B2 | 1/2004 | McGuckin, Jr. et al. |
| 6,695,878 B2 | 2/2004 | McGuckin, Jr. et al. |
| 6,712,836 B1 | 3/2004 | Berg et al. |
| 6,716,207 B2 | 4/2004 | Farnholtz |
| 6,729,356 B1 | 5/2004 | Baker et al. |
| 6,733,525 B2 | 5/2004 | Yang et al. |
| 6,746,422 B1 | 6/2004 | Noriega et al. |
| 6,749,560 B1 | 6/2004 | Konstorum et al. |
| 6,780,200 B2 | 8/2004 | Jansen |
| 6,790,229 B1 | 9/2004 | Berreklouw |
| 6,790,230 B2 | 9/2004 | Beyersdorf et al. |
| 6,830,584 B1 | 12/2004 | Seguin |
| 6,875,231 B2 | 4/2005 | Anduiza et al. |
| 7,018,406 B2 | 3/2006 | Seguin et al. |
| 7,186,265 B2 | 3/2007 | Sharkawy et al. |
| 7,192,440 B2 | 3/2007 | Andreas et al. |
| 7,201,772 B2 | 4/2007 | Schwammenthal et al. |
| 7,276,078 B2 | 10/2007 | Spenser et al. |
| 7,318,278 B2 | 1/2008 | Zhang et al. |
| 7,374,571 B2 | 5/2008 | Pease et al. |
| 7,381,210 B2 | 6/2008 | Zarbatany et al. |
| 7,381,219 B2 | 6/2008 | Salahieh et al. |
| 7,429,269 B2 | 9/2008 | Schwammenthal et al. |
| 7,445,631 B2 | 11/2008 | Salahieh et al. |
| 7,462,191 B2 | 12/2008 | Spenser et al. |
| 7,530,253 B2 | 5/2009 | Spenser et al. |
| 7,553,324 B2 | 6/2009 | Andreas et al. |
| 7,579,381 B2 | 8/2009 | Dove |
| 7,704,222 B2 | 4/2010 | Wilk et al. |
| 7,806,919 B2 | 10/2010 | Bloom et al. |
| 7,824,443 B2 | 11/2010 | Salahieh et al. |
| 7,892,281 B2 | 2/2011 | Seguin et al. |
| 7,914,569 B2 | 3/2011 | Nguyen et al. |
| 7,914,575 B2 | 3/2011 | Guyenot et al. |
| 7,959,672 B2 | 6/2011 | Salahieh et al. |
| 7,981,151 B2 | 7/2011 | Rowe |
| 7,993,392 B2 | 8/2011 | Righini et al. |
| 7,993,394 B2 | 8/2011 | Hariton et al. |
| 8,007,992 B2 | 8/2011 | Tian et al. |
| 8,016,877 B2 | 9/2011 | Seguin et al. |
| 8,029,556 B2 | 10/2011 | Rowe |
| 8,070,800 B2 | 12/2011 | Lock et al. |
| 8,075,615 B2 | 12/2011 | Eberhardt et al. |
| 8,092,520 B2 | 1/2012 | Quadri |
| 8,092,521 B2 | 1/2012 | Figulla et al. |
| 8,109,996 B2 | 2/2012 | Stacchino et al. |
| 8,136,218 B2 | 3/2012 | Millwee et al. |
| 8,137,398 B2 | 3/2012 | Tuval et al. |
| 8,157,852 B2 | 4/2012 | Bloom et al. |
| 8,182,530 B2 | 5/2012 | Huber |
| 8,219,229 B2 | 7/2012 | Cao et al. |
| 8,220,121 B2 | 7/2012 | Hendriksen et al. |
| 8,246,675 B2 | 8/2012 | Zegdi |
| 8,252,052 B2 | 8/2012 | Salahieh et al. |
| 8,287,584 B2 | 10/2012 | Salahieh et al. |
| 8,317,858 B2 | 11/2012 | Straubinger et al. |
| 8,337,541 B2 | 12/2012 | Quadri et al. |
| 8,353,953 B2 | 1/2013 | Giannetti et al. |
| 8,398,704 B2 | 3/2013 | Straubinger et al. |
| 8,403,983 B2 | 3/2013 | Quadri et al. |
| 8,414,645 B2 | 4/2013 | Dwork et al. |
| 8,416,643 B2 | 4/2013 | Magee |
| 8,444,689 B2 | 5/2013 | Zhang |
| 8,460,368 B2 | 6/2013 | Taylor et al. |
| 8,460,370 B2 | 6/2013 | Zakay et al. |
| 8,470,023 B2 | 6/2013 | Eidenschink et al. |
| 8,470,028 B2 | 6/2013 | Thornton et al. |
| 8,475,521 B2 | 7/2013 | Suri et al. |
| 8,475,523 B2 | 7/2013 | Duffy |
| 8,479,380 B2 | 7/2013 | Malewicz et al. |
| 8,491,650 B2 | 7/2013 | Wiemeyer et al. |
| 8,500,733 B2 | 8/2013 | Watson |
| 8,500,798 B2 | 8/2013 | Rowe et al. |
| 8,511,244 B2 | 8/2013 | Holecek et al. |
| 8,512,401 B2 | 8/2013 | Murray, III et al. |
| 8,518,096 B2 | 8/2013 | Nelson |
| 8,518,106 B2 | 8/2013 | Duffy et al. |
| 8,562,663 B2 | 10/2013 | Mearns et al. |
| 8,579,963 B2 | 11/2013 | Tabor |
| 8,617,236 B2 | 12/2013 | Paul et al. |
| 8,640,521 B2 | 2/2014 | Righini et al. |
| 8,647,381 B2 | 2/2014 | Essinger et al. |
| 8,652,145 B2 | 2/2014 | Maimon et al. |
| 8,652,201 B2 | 2/2014 | Oberti et al. |
| 8,652,203 B2 | 2/2014 | Quadri et al. |
| 8,679,404 B2 | 3/2014 | Liburd et al. |
| 8,721,708 B2 | 5/2014 | Seguin et al. |
| 8,728,155 B2 | 5/2014 | Montorfano et al. |
| 8,740,974 B2 | 6/2014 | Lambrecht et al. |
| 8,740,976 B2 | 6/2014 | Tran et al. |
| 8,747,458 B2 | 6/2014 | Tuval et al. |
| 8,747,459 B2 | 6/2014 | Nguyen et al. |
| 8,764,818 B2 | 7/2014 | Gregg |
| 8,771,344 B2 | 7/2014 | Tran et al. |
| 8,778,020 B2 | 7/2014 | Gregg et al. |
| 8,784,337 B2 | 7/2014 | Voeller et al. |
| 8,784,478 B2 | 7/2014 | Tuval et al. |
| 8,784,481 B2 | 7/2014 | Alkhatib et al. |
| 8,790,387 B2 | 7/2014 | Nguyen et al. |
| 8,795,357 B2 | 8/2014 | Yohanan et al. |
| 8,808,356 B2 | 8/2014 | Braido et al. |
| 8,828,079 B2 | 9/2014 | Thielen et al. |
| 8,858,620 B2 | 10/2014 | Salahieh et al. |
| 8,870,948 B1 | 10/2014 | Erzberger et al. |
| 8,870,950 B2 | 10/2014 | Hacohen |
| 8,876,893 B2 | 11/2014 | Dwork et al. |
| 8,926,693 B2 | 1/2015 | Duffy et al. |
| 8,926,694 B2 | 1/2015 | Costello |
| 8,939,960 B2 | 1/2015 | Rosenman et al. |
| 8,961,593 B2 | 2/2015 | Bonhoeffer et al. |
| 8,961,595 B2 | 2/2015 | Alkhatib |
| 8,974,524 B2 | 3/2015 | Yeung et al. |
| 8,986,375 B2 | 3/2015 | Garde et al. |
| 8,998,980 B2 | 4/2015 | Shipley et al. |
| 9,005,273 B2 | 4/2015 | Salahieh et al. |
| 9,011,521 B2 | 4/2015 | Haug et al. |
| 9,011,523 B2 | 4/2015 | Seguin |
| 9,011,524 B2 | 4/2015 | Eberhardt |
| 9,034,032 B2 | 5/2015 | McLEAN et al. |
| 9,055,937 B2 | 6/2015 | Rowe et al. |
| 9,066,801 B2 | 6/2015 | Kovalsky et al. |
| 9,078,749 B2 | 7/2015 | Lutter et al. |
| 9,078,751 B2 | 7/2015 | Naor |
| 9,125,738 B2 | 9/2015 | Figulla et al. |
| 9,173,737 B2 | 11/2015 | Hill et al. |
| 9,186,249 B2 | 11/2015 | Rolando et al. |
| 9,277,990 B2 | 3/2016 | Klima et al. |
| 9,277,993 B2 | 3/2016 | Gamarra et al. |
| 9,289,291 B2 | 3/2016 | Gorman, III et al. |
| 9,445,897 B2 | 9/2016 | Bishop et al. |
| 9,456,877 B2 | 10/2016 | Weitzner et al. |
| 9,681,968 B2 | 6/2017 | Goetz et al. |
| 9,687,345 B2 | 6/2017 | Rabito et al. |
| 9,700,329 B2 | 7/2017 | Metzger et al. |
| 9,700,411 B2 | 7/2017 | Klima et al. |
| 9,724,083 B2 | 8/2017 | Quadri et al. |
| 9,795,479 B2 | 10/2017 | Lim et al. |
| 9,833,313 B2 | 12/2017 | Board et al. |
| 9,861,473 B2 | 1/2018 | Lafontaine |
| 9,861,476 B2 | 1/2018 | Salahieh et al. |
| 9,861,477 B2 | 1/2018 | Backus et al. |
| 9,867,698 B2 | 1/2018 | Kovalsky et al. |
| 9,877,830 B2 | 1/2018 | Lim et al. |

(56) References Cited

U.S. PATENT DOCUMENTS

| | | |
|---|---|---|
| 9,889,029 B2 | 2/2018 | Li et al. |
| 9,895,225 B2 | 2/2018 | Rolando et al. |
| 9,925,045 B2 | 3/2018 | Creaven et al. |
| 10,004,599 B2 | 6/2018 | Rabito et al. |
| 10,179,044 B2 | 1/2019 | Ratz et al. |
| 10,350,066 B2 | 7/2019 | Cooper et al. |
| 10,376,363 B2 | 8/2019 | Quadri et al. |
| 10,575,951 B2 | 3/2020 | Johnson et al. |
| 10,695,177 B2 | 6/2020 | Hariton et al. |
| 10,758,344 B2 | 9/2020 | Hariton et al. |
| 11,406,499 B2 | 8/2022 | Zhang et al. |
| 11,672,658 B2 | 6/2023 | Hariton et al. |
| 11,903,829 B1 | 2/2024 | Ma et al. |
| 12,295,839 B2 | 5/2025 | Becerra et al. |
| 2002/0032481 A1 | 3/2002 | Gabbay |
| 2002/0045929 A1 | 4/2002 | Diaz |
| 2002/0052644 A1 | 5/2002 | Shaolian et al. |
| 2002/0107565 A1 | 8/2002 | Greenhalgh |
| 2002/0123802 A1 | 9/2002 | Snyders |
| 2002/0173842 A1 | 11/2002 | Buchanan |
| 2003/0050694 A1 | 3/2003 | Yang et al. |
| 2003/0100939 A1 | 5/2003 | Yodfat et al. |
| 2003/0105517 A1 | 6/2003 | White et al. |
| 2003/0120333 A1 | 6/2003 | Ouriel et al. |
| 2003/0130729 A1 | 7/2003 | Paniagua et al. |
| 2003/0149477 A1 | 8/2003 | Gabbay |
| 2003/0149478 A1 | 8/2003 | Figulla et al. |
| 2003/0158597 A1 | 8/2003 | Quiachon et al. |
| 2003/0176914 A1 | 9/2003 | Rabkin et al. |
| 2003/0199971 A1 | 10/2003 | Tower et al. |
| 2003/0212454 A1 | 11/2003 | Scott et al. |
| 2003/0220683 A1 | 11/2003 | Minasian et al. |
| 2004/0092858 A1 | 5/2004 | Wilson et al. |
| 2004/0093075 A1 | 5/2004 | Kuehne |
| 2004/0117009 A1 | 6/2004 | Cali et al. |
| 2004/0133263 A1 | 7/2004 | Dusbabek et al. |
| 2004/0133273 A1 | 7/2004 | Cox |
| 2004/0186563 A1 | 9/2004 | Lobbi |
| 2004/0210307 A1 | 10/2004 | Khairkhahan |
| 2004/0215325 A1 | 10/2004 | Penn et al. |
| 2004/0225353 A1 | 11/2004 | McGuckin et al. |
| 2004/0236411 A1 | 11/2004 | Sarac et al. |
| 2004/0260389 A1 | 12/2004 | Case et al. |
| 2005/0033398 A1 | 2/2005 | Seguin |
| 2005/0075727 A1 | 4/2005 | Wheatley |
| 2005/0090887 A1 | 4/2005 | Pryor |
| 2005/0096738 A1 | 5/2005 | Cali et al. |
| 2005/0107872 A1 | 5/2005 | Mensah et al. |
| 2005/0137682 A1 | 6/2005 | Justino |
| 2005/0137686 A1 | 6/2005 | Salahieh et al. |
| 2005/0137687 A1 | 6/2005 | Salahieh et al. |
| 2005/0137688 A1 | 6/2005 | Salahieh et al. |
| 2005/0137691 A1 | 6/2005 | Salahieh et al. |
| 2005/0137698 A1 | 6/2005 | Salahieh et al. |
| 2005/0159811 A1 | 7/2005 | Lane |
| 2005/0182486 A1 | 8/2005 | Gabbay |
| 2005/0203614 A1 | 9/2005 | Forster et al. |
| 2005/0216079 A1 | 9/2005 | Macoviak |
| 2005/0234546 A1 | 10/2005 | Nugent et al. |
| 2005/0288766 A1 | 12/2005 | Plain et al. |
| 2006/0020327 A1 | 1/2006 | Lashinski et al. |
| 2006/0058872 A1 | 3/2006 | Salahieh et al. |
| 2006/0095115 A1 | 5/2006 | Bladillah et al. |
| 2006/0142837 A1 | 6/2006 | Haverkost et al. |
| 2006/0149350 A1 | 7/2006 | Patel et al. |
| 2006/0161249 A1 | 7/2006 | Realyvasquez et al. |
| 2006/0195134 A1 | 8/2006 | Crittenden |
| 2006/0195183 A1 | 8/2006 | Navia et al. |
| 2006/0212110 A1 | 9/2006 | Osborne et al. |
| 2006/0229719 A1 | 10/2006 | Marquez et al. |
| 2006/0241745 A1 | 10/2006 | Solem |
| 2006/0259135 A1 | 11/2006 | Navia et al. |
| 2006/0259137 A1 | 11/2006 | Artof et al. |
| 2006/0276874 A1 | 12/2006 | Wilson et al. |
| 2006/0293745 A1 | 12/2006 | Carpentier et al. |
| 2007/0010877 A1 | 1/2007 | Salahieh et al. |
| 2007/0027534 A1 | 2/2007 | Bergheim et al. |
| 2007/0043435 A1 | 2/2007 | Seguin et al. |
| 2007/0050021 A1 | 3/2007 | Johnson |
| 2007/0066863 A1 | 3/2007 | Rafiee et al. |
| 2007/0088431 A1 | 4/2007 | Bourang et al. |
| 2007/0100432 A1 | 5/2007 | Case et al. |
| 2007/0100439 A1 | 5/2007 | Cangialosi et al. |
| 2007/0112422 A1 | 5/2007 | Dehdashtian et al. |
| 2007/0129794 A1 | 6/2007 | Realyvasquez |
| 2007/0142906 A1 | 6/2007 | Figulla et al. |
| 2007/0156224 A1 | 7/2007 | Cioanta et al. |
| 2007/0203503 A1 | 8/2007 | Salahieh et al. |
| 2007/0203575 A1 | 8/2007 | Forster et al. |
| 2007/0213813 A1 | 9/2007 | Von Segesser et al. |
| 2007/0255394 A1 | 11/2007 | Ryan |
| 2007/0270943 A1 | 11/2007 | Solem et al. |
| 2008/0021546 A1 | 1/2008 | Patz et al. |
| 2008/0065011 A1 | 3/2008 | Marchand et al. |
| 2008/0071361 A1 | 3/2008 | Tuval et al. |
| 2008/0082164 A1 | 4/2008 | Friedman |
| 2008/0082165 A1 | 4/2008 | Wilson et al. |
| 2008/0082166 A1 | 4/2008 | Styrc et al. |
| 2008/0097581 A1 | 4/2008 | Shanley |
| 2008/0114442 A1 | 5/2008 | Mitchell et al. |
| 2008/0147179 A1 | 6/2008 | Cai et al. |
| 2008/0147183 A1 | 6/2008 | Styrc |
| 2008/0154355 A1 | 6/2008 | Benichou et al. |
| 2008/0161910 A1 | 7/2008 | Revuelta et al. |
| 2008/0177381 A1 | 7/2008 | Navia et al. |
| 2008/0183273 A1 | 7/2008 | Mesana et al. |
| 2008/0208328 A1 | 8/2008 | Antocci et al. |
| 2008/0221672 A1 | 9/2008 | Lamphere et al. |
| 2008/0228254 A1 | 9/2008 | Ryan |
| 2008/0255660 A1 | 10/2008 | Guyenot et al. |
| 2008/0255661 A1 | 10/2008 | Straubinger et al. |
| 2008/0281411 A1 | 11/2008 | Berreklouw |
| 2009/0005863 A1 | 1/2009 | Goetz et al. |
| 2009/0054968 A1 | 2/2009 | Bonhoeffer et al. |
| 2009/0054974 A1 | 2/2009 | McGuckin, Jr. et al. |
| 2009/0076598 A1 | 3/2009 | Salahieh et al. |
| 2009/0112309 A1 | 4/2009 | Jaramillo et al. |
| 2009/0138079 A1 | 5/2009 | Tuval et al. |
| 2009/0157175 A1 | 6/2009 | Benichou |
| 2009/0164005 A1 | 6/2009 | Dove et al. |
| 2009/0171456 A1 | 7/2009 | Kveen et al. |
| 2009/0182413 A1 | 7/2009 | Burkart et al. |
| 2009/0188964 A1 | 7/2009 | Orlov |
| 2009/0216310 A1 | 8/2009 | Straubinger et al. |
| 2009/0216313 A1 | 8/2009 | Straubinger et al. |
| 2009/0216322 A1 | 8/2009 | Le et al. |
| 2009/0234443 A1 | 9/2009 | Ottma et al. |
| 2009/0240320 A1 | 9/2009 | Tuval et al. |
| 2009/0270972 A1 | 10/2009 | Lane |
| 2009/0276027 A1 | 11/2009 | Glynn |
| 2009/0276040 A1 | 11/2009 | Rowe et al. |
| 2009/0281618 A1 | 11/2009 | Hill et al. |
| 2009/0281619 A1 | 11/2009 | Le et al. |
| 2009/0287296 A1 | 11/2009 | Manasse |
| 2009/0287299 A1 | 11/2009 | Tabor et al. |
| 2009/0292350 A1 | 11/2009 | Eberhardt et al. |
| 2009/0306768 A1 | 12/2009 | Quadri |
| 2009/0319037 A1 | 12/2009 | Rowe et al. |
| 2010/0024818 A1 | 2/2010 | Stenzler et al. |
| 2010/0049313 A1 | 2/2010 | Alon et al. |
| 2010/0069852 A1 | 3/2010 | Kelley |
| 2010/0114305 A1 | 5/2010 | Kang et al. |
| 2010/0145438 A1 | 6/2010 | Barone |
| 2010/0191326 A1 | 7/2010 | Alkhatib |
| 2010/0204781 A1 | 8/2010 | Alkhatib |
| 2010/0217382 A1 | 8/2010 | Chau et al. |
| 2010/0249894 A1 | 9/2010 | Oba et al. |
| 2010/0249911 A1 | 9/2010 | Alkhatib |
| 2010/0256723 A1 | 10/2010 | Murray |
| 2010/0262231 A1 | 10/2010 | Tuval et al. |
| 2010/0305475 A1 | 12/2010 | Hinchliffe et al. |
| 2010/0305685 A1 | 12/2010 | Millwee et al. |
| 2010/0312333 A1 | 12/2010 | Navia et al. |

(56) References Cited

U.S. PATENT DOCUMENTS

| | | |
|---|---|---|
| 2010/0318172 A1* | 12/2010 | Schaefer .............. A61M 25/09 623/2.11 |
| 2011/0015616 A1 | 1/2011 | Straubinger et al. |
| 2011/0015729 A1 | 1/2011 | Jimenez et al. |
| 2011/0029072 A1 | 2/2011 | Gabbay |
| 2011/0137397 A1 | 6/2011 | Chau et al. |
| 2011/0208290 A1 | 8/2011 | Straubinger et al. |
| 2011/0208297 A1 | 8/2011 | Tuval et al. |
| 2011/0224785 A1 | 9/2011 | Hacohen |
| 2011/0238159 A1 | 9/2011 | Guyenot et al. |
| 2011/0264196 A1 | 10/2011 | Savage et al. |
| 2011/0264198 A1 | 10/2011 | Murray, III et al. |
| 2011/0313515 A1 | 12/2011 | Quadri et al. |
| 2011/0319989 A1 | 12/2011 | Lane et al. |
| 2012/0022639 A1 | 1/2012 | Hacohen et al. |
| 2012/0035722 A1 | 2/2012 | Tuval |
| 2012/0041550 A1 | 2/2012 | Salahieh et al. |
| 2012/0078360 A1 | 3/2012 | Rafiee |
| 2012/0101571 A1 | 4/2012 | Thambar et al. |
| 2012/0101572 A1 | 4/2012 | Kovalsky et al. |
| 2012/0123529 A1 | 5/2012 | Levi et al. |
| 2012/0215303 A1 | 8/2012 | Quadri et al. |
| 2012/0271398 A1 | 10/2012 | Essinger et al. |
| 2012/0290062 A1 | 11/2012 | McNamara et al. |
| 2012/0296418 A1 | 11/2012 | Bonyuet et al. |
| 2012/0310328 A1 | 12/2012 | Olson et al. |
| 2013/0006294 A1 | 1/2013 | Kashkarov et al. |
| 2013/0035759 A1 | 2/2013 | Gross et al. |
| 2013/0079869 A1 | 3/2013 | Straubinger et al. |
| 2013/0172992 A1 | 7/2013 | Gross et al. |
| 2013/0190861 A1 | 7/2013 | Chau et al. |
| 2013/0190862 A1 | 7/2013 | Pintor et al. |
| 2013/0197622 A1 | 8/2013 | Mitra et al. |
| 2013/0211508 A1 | 8/2013 | Lane et al. |
| 2013/0253635 A1 | 9/2013 | Straubinger et al. |
| 2013/0253642 A1 | 9/2013 | Brecker |
| 2013/0310928 A1 | 11/2013 | Morriss et al. |
| 2013/0331929 A1 | 12/2013 | Mitra et al. |
| 2013/0338766 A1 | 12/2013 | Hastings et al. |
| 2013/0345786 A1 | 12/2013 | Behan |
| 2014/0018912 A1 | 1/2014 | Delaloye et al. |
| 2014/0025163 A1 | 1/2014 | Padala et al. |
| 2014/0052237 A1 | 2/2014 | Lane et al. |
| 2014/0066895 A1 | 3/2014 | Kipperman |
| 2014/0100651 A1 | 4/2014 | Kheradvar et al. |
| 2014/0163668 A1 | 6/2014 | Rafiee |
| 2014/0172077 A1 | 6/2014 | Bruchman et al. |
| 2014/0172083 A1 | 6/2014 | Bruchman et al. |
| 2014/0194981 A1 | 7/2014 | Menk et al. |
| 2014/0207231 A1 | 7/2014 | Hacohen et al. |
| 2014/0214157 A1 | 7/2014 | Bortlein |
| 2014/0222136 A1 | 8/2014 | Geist et al. |
| 2014/0222139 A1 | 8/2014 | Nguyen et al. |
| 2014/0222142 A1 | 8/2014 | Kovalsky et al. |
| 2014/0222144 A1 | 8/2014 | Eberhardt et al. |
| 2014/0243966 A1 | 8/2014 | Garde et al. |
| 2014/0257467 A1 | 9/2014 | Lane et al. |
| 2014/0277390 A1 | 9/2014 | Ratz et al. |
| 2014/0277403 A1 | 9/2014 | Peter |
| 2014/0277412 A1 | 9/2014 | Bortlein |
| 2014/0277422 A1 | 9/2014 | Ratz et al. |
| 2014/0277426 A1 | 9/2014 | Dakin et al. |
| 2014/0277427 A1 | 9/2014 | Ratz et al. |
| 2014/0296975 A1 | 10/2014 | Tegels et al. |
| 2014/0303719 A1 | 10/2014 | Cox et al. |
| 2014/0324160 A1 | 10/2014 | Benichou et al. |
| 2014/0324164 A1 | 10/2014 | Gross et al. |
| 2014/0330368 A1 | 11/2014 | Gloss et al. |
| 2014/0330371 A1 | 11/2014 | Gloss et al. |
| 2014/0330372 A1 | 11/2014 | Weston et al. |
| 2014/0336754 A1 | 11/2014 | Gurskis et al. |
| 2014/0343457 A1 | 11/2014 | Shekalim et al. |
| 2014/0343669 A1 | 11/2014 | Lane et al. |
| 2014/0343670 A1 | 11/2014 | Bakis et al. |
| 2014/0350666 A1 | 11/2014 | Righini |
| 2014/0350668 A1 | 11/2014 | Delaloye et al. |
| 2014/0358223 A1 | 12/2014 | Rafiee et al. |
| 2014/0364939 A1 | 12/2014 | Deshmukh et al. |
| 2014/0364943 A1 | 12/2014 | Conklin |
| 2014/0371842 A1 | 12/2014 | Marquez et al. |
| 2014/0371844 A1 | 12/2014 | Dale et al. |
| 2014/0371847 A1 | 12/2014 | Madrid et al. |
| 2014/0371848 A1 | 12/2014 | Murray, III et al. |
| 2015/0005863 A1 | 1/2015 | Para |
| 2015/0018944 A1 | 1/2015 | O'Connell et al. |
| 2015/0039083 A1 | 2/2015 | Rafiee |
| 2015/0142100 A1 | 5/2015 | Morriss et al. |
| 2015/0142103 A1 | 5/2015 | Vidlund |
| 2015/0148731 A1 | 5/2015 | McNamara et al. |
| 2015/0173897 A1 | 6/2015 | Raanani et al. |
| 2015/0196390 A1 | 7/2015 | Ma et al. |
| 2015/0209141 A1 | 7/2015 | Braido et al. |
| 2015/0272737 A1 | 10/2015 | Dale et al. |
| 2015/0297346 A1 | 10/2015 | Duffy et al. |
| 2015/0351903 A1 | 12/2015 | Morriss et al. |
| 2015/0359629 A1 | 12/2015 | Ganesan et al. |
| 2016/0000591 A1 | 1/2016 | Lei et al. |
| 2016/0030169 A1 | 2/2016 | Shahriari |
| 2016/0030170 A1 | 2/2016 | Alkhatib et al. |
| 2016/0038280 A1 | 2/2016 | Morriss et al. |
| 2016/0038281 A1 | 2/2016 | Delaloye |
| 2016/0074160 A1 | 3/2016 | Christianson et al. |
| 2016/0106537 A1 | 4/2016 | Christianson et al. |
| 2016/0113765 A1 | 4/2016 | Ganesan et al. |
| 2016/0113768 A1 | 4/2016 | Ganesan et al. |
| 2016/0143732 A1 | 5/2016 | Glimsdale |
| 2016/0158010 A1 | 6/2016 | Lim et al. |
| 2016/0166383 A1 | 6/2016 | Lim et al. |
| 2016/0184097 A1 | 6/2016 | Lim et al. |
| 2016/0199206 A1 | 7/2016 | Lim et al. |
| 2016/0213473 A1 | 7/2016 | Hacohen et al. |
| 2016/0228684 A1 | 8/2016 | Martin |
| 2016/0235529 A1 | 8/2016 | Ma et al. |
| 2016/0278923 A1 | 9/2016 | Krans et al. |
| 2016/0279386 A1 | 9/2016 | Dale et al. |
| 2016/0310267 A1 | 10/2016 | Zeng et al. |
| 2017/0042678 A1 | 2/2017 | Ganesan et al. |
| 2017/0079785 A1 | 3/2017 | Li |
| 2017/0128209 A1 | 5/2017 | Morriss et al. |
| 2017/0216023 A1 | 8/2017 | Lane et al. |
| 2017/0216575 A1 | 8/2017 | Asleson et al. |
| 2017/0257902 A1 | 9/2017 | Xing et al. |
| 2017/0258614 A1 | 9/2017 | Griffin |
| 2017/0325945 A1 | 11/2017 | Dale et al. |
| 2017/0325954 A1 | 11/2017 | Perszyk |
| 2017/0333186 A1 | 11/2017 | Spargias |
| 2017/0348096 A1 | 12/2017 | Anderson |
| 2017/0367821 A1 | 12/2017 | Landon et al. |
| 2017/0367823 A1 | 12/2017 | Hariton et al. |
| 2018/0014931 A1 | 1/2018 | Morriss et al. |
| 2018/0021129 A1 | 1/2018 | Peterson et al. |
| 2018/0055629 A1 | 3/2018 | Oba et al. |
| 2018/0055636 A1 | 3/2018 | Valencia et al. |
| 2018/0085218 A1 | 3/2018 | Eidenschink |
| 2018/0110534 A1 | 4/2018 | Gavala et al. |
| 2018/0110622 A1 | 4/2018 | Gregg et al. |
| 2018/0116790 A1 | 5/2018 | Ratz et al. |
| 2018/0126119 A1 | 5/2018 | McNiven et al. |
| 2018/0161549 A1* | 6/2018 | McDonald ........ A61M 25/0054 |
| 2018/0296341 A1 | 10/2018 | Noe et al. |
| 2018/0344457 A1 | 12/2018 | Gross et al. |
| 2018/0344490 A1 | 12/2018 | Fox et al. |
| 2019/0008639 A1 | 1/2019 | Landon et al. |
| 2019/0060072 A1 | 2/2019 | Zeng |
| 2019/0262129 A1 | 8/2019 | Cooper et al. |
| 2020/0000579 A1 | 1/2020 | Manash et al. |
| 2020/0107930 A1* | 4/2020 | Argento ................ A61F 2/2418 |
| 2020/0108225 A1 | 4/2020 | Jamal et al. |
| 2020/0138572 A1 | 5/2020 | Zhao et al. |
| 2020/0323668 A1 | 10/2020 | Diedering et al. |
| 2020/0345494 A1 | 11/2020 | Srinimukesh et al. |
| 2020/0352718 A1 | 11/2020 | Rowe et al. |
| 2021/0015615 A1 | 1/2021 | Groothuis et al. |
| 2021/0228354 A1 | 7/2021 | Rafiee et al. |

(56) References Cited

U.S. PATENT DOCUMENTS

| | | |
|---|---|---|
| 2021/0259835 A1 | 8/2021 | Tyler, II et al. |
| 2021/0378817 A1 | 12/2021 | Nia et al. |
| 2022/0142777 A1 | 5/2022 | Scheinblum et al. |
| 2022/0287836 A1 | 9/2022 | Landon et al. |
| 2022/0346993 A1 | 11/2022 | Srinimukesh et al. |
| 2023/0000624 A1 | 1/2023 | Okabe et al. |
| 2023/0200980 A1 | 6/2023 | Peterson et al. |
| 2023/0218391 A1 | 7/2023 | Dass et al. |
| 2023/0380963 A1 | 11/2023 | Kaufman et al. |
| 2023/0390052 A1 | 12/2023 | Okafor et al. |
| 2024/0008978 A1 | 1/2024 | Nawalakhe et al. |
| 2024/0091000 A1 | 3/2024 | King et al. |

FOREIGN PATENT DOCUMENTS

| | | |
|---|---|---|
| DE | 19532846 A1 | 3/1997 |
| DE | 19907646 A1 | 8/2000 |
| DE | 10049813 C1 | 4/2002 |
| DE | 19546692 C2 | 11/2002 |
| DE | 19857887 B4 | 5/2005 |
| DE | 102006052564 B3 | 12/2007 |
| EP | 0103546 B1 | 5/1988 |
| EP | 0850607 A1 | 7/1998 |
| EP | 1057460 A1 | 12/2000 |
| EP | 1259194 B1 | 2/2005 |
| EP | 1088529 B1 | 6/2005 |
| EP | 1171059 B1 | 11/2005 |
| EP | 1469797 B1 | 11/2005 |
| EP | 1239901 B1 | 10/2007 |
| EP | 1849440 A1 | 10/2007 |
| EP | 1472996 B1 | 9/2009 |
| EP | 1653888 B1 | 9/2009 |
| EP | 1935377 B1 | 3/2010 |
| EP | 1369098 B1 | 4/2014 |
| EP | 2124826 B1 | 7/2014 |
| EP | 2745805 B1 | 6/2015 |
| EP | 2749254 B1 | 6/2015 |
| EP | 2168536 B1 | 4/2016 |
| EP | 2413842 B1 | 8/2017 |
| EP | 2446915 B1 | 1/2018 |
| EP | 3057541 B1 | 1/2018 |
| EP | 3037064 B1 | 3/2018 |
| EP | 3046511 B1 | 3/2018 |
| EP | 3142603 B1 | 3/2018 |
| EP | 3075354 B1 | 11/2018 |
| EP | 3184083 B1 | 2/2019 |
| EP | 2918249 B1 | 4/2020 |
| EP | 3417813 B1 | 5/2020 |
| EP | 2777616 B1 | 8/2020 |
| EP | 3139864 B1 | 11/2020 |
| EP | 2777617 B1 | 9/2022 |
| FR | 2788217 A1 | 7/2000 |
| GB | 1264471 A | 2/1972 |
| GB | 1315844 A | 5/1973 |
| GB | 2398245 B | 3/2007 |
| SU | 1271508 A1 | 11/1986 |
| WO | WO-1991017720 A1 | 11/1991 |
| WO | WO-1992017118 A1 | 10/1992 |
| WO | WO-1993001768 A1 | 2/1993 |
| WO | WO-1997024080 A1 | 7/1997 |
| WO | WO-1999033414 A1 | 7/1999 |
| WO | WO-1999040964 A1 | 8/1999 |
| WO | WO-1999047075 A1 | 9/1999 |
| WO | WO-2000018333 A1 | 4/2000 |
| WO | WO-2000041652 A1 | 7/2000 |
| WO | WO-2000047139 A1 | 8/2000 |
| WO | WO-2000061034 A1 | 10/2000 |
| WO | WO-2001028459 A1 | 4/2001 |
| WO | WO-2001035878 A2 | 5/2001 |
| WO | WO-2001049213 A2 | 7/2001 |
| WO | WO-2001054624 A1 | 8/2001 |
| WO | WO-2001054625 A1 | 8/2001 |
| WO | WO-2001064137 A1 | 9/2001 |
| WO | WO-2001076510 A2 | 10/2001 |
| WO | WO-2002036048 A1 | 5/2002 |
| WO | WO-2002041789 A2 | 5/2002 |
| WO | WO-2003047468 A1 | 6/2003 |
| WO | WO-2003092554 A1 | 11/2003 |
| WO | WO-2004030569 A2 | 4/2004 |
| WO | WO-2005011534 A1 | 2/2005 |
| WO | WO-2005034812 A1 | 4/2005 |
| WO | WO-2005062980 A2 | 7/2005 |
| WO | WO-2005087140 A1 | 9/2005 |
| WO | WO-2005102015 A2 | 11/2005 |
| WO | WO-2006014233 A2 | 2/2006 |
| WO | WO-2006034008 A2 | 3/2006 |
| WO | WO-2006085225 A1 | 8/2006 |
| WO | WO-2006138173 A2 | 12/2006 |
| WO | WO-2007025028 A1 | 3/2007 |
| WO | WO-2008005405 A2 | 1/2008 |
| WO | WO-2008125153 A1 | 10/2008 |
| WO | WO-2008147964 A1 | 12/2008 |
| WO | WO-2008150529 A1 | 12/2008 |
| WO | WO-2009024859 A2 | 2/2009 |
| WO | WO-2009026563 A2 | 2/2009 |
| WO | WO-2009042196 A2 | 4/2009 |
| WO | WO-2009091509 A1 | 7/2009 |
| WO | WO-2009094500 A1 | 7/2009 |
| WO | WO-2010005524 A2 | 1/2010 |
| WO | WO-2010008549 A1 | 1/2010 |
| WO | WO-2010121076 A2 | 10/2010 |
| WO | WO-2011002996 A2 | 1/2011 |
| WO | WO-2011081997 A1 | 7/2011 |
| WO | WO-2012032187 A1 | 3/2012 |
| WO | WO-2012095455 A2 | 7/2012 |
| WO | WO-2013028387 A2 | 2/2013 |
| WO | WO-2013106585 A1 | 7/2013 |
| WO | WO-2014018432 A2 | 1/2014 |
| WO | WO-2014079291 A1 | 5/2014 |
| WO | WO-2014145338 A1 | 9/2014 |
| WO | WO-2014149865 A1 | 9/2014 |
| WO | WO-2014163706 A1 | 10/2014 |
| WO | WO-2014194178 A1 | 12/2014 |
| WO | WO-2015057407 A1 | 4/2015 |
| WO | WO-2015077274 A1 | 5/2015 |
| WO | WO-2016016899 A1 | 2/2016 |
| WO | WO-2017035487 A1 | 3/2017 |
| WO | WO-2018213209 A1 | 11/2018 |
| WO | WO-2023076103 A1 | 5/2023 |
| WO | WO-2023081236 A1 | 5/2023 |
| WO | WO-2023091769 A1 | 5/2023 |
| WO | WO-2023096804 A1 | 6/2023 |
| WO | WO-2023154250 A1 | 8/2023 |
| WO | WO-2023196150 A1 | 10/2023 |
| WO | WO-2023244454 A1 | 12/2023 |
| WO | WO-2023244767 A1 | 12/2023 |
| WO | WO-2023250114 A1 | 12/2023 |
| WO | WO-2024009540 A1 | 1/2024 |
| WO | WO-2024010739 A1 | 1/2024 |
| WO | WO-2024030520 A1 | 2/2024 |

OTHER PUBLICATIONS

Andersen, H.R. "History of Percutaneous Aortic Valve Prosthesis," Herz No. 34. pp. 343-346. 2009.

Bavaria, Joseph E. M.D., "CardiAQ Valve Technologies Transcatheter Mitral Valve Implantation", 11 pages, 2009, CardiAQ Valve Technologies, Inc., Irvine, California.

Berreklouw E., et al., "Sutureless Mitral Valve Replacement with Bioprostheses and Nitinol Attachment Rings: Feasibility in Acute Pig Experiments," The Journal of Thoracic and Cardiovascular Surgery, Aug. 2011, vol. 142, No. 2, pp. 390-395(395e1), (7 Pages), Applicant believes this may have been available online as early as Feb. 4, 2011.

BIOSPACE: "CardiAQ Valve Technologies (CVT) Reports Cardiovascular Medicine Milestone: First-In-Human Non-Surgical Percutaneous Implantation of a Bioprosthetic Mitral Heart Valve," Jun. 14, 2012, p. 1 (3 Pages), [Retrieved on Mar. 1, 2016], Retrieved from URL: http://www.biospace.com/News/cardiaq-valve-technologies-cvt-reports/263900.

BIOSPACE: "CardiAQ Valve Technologies (CVT) Reports First-In-Human Percutaneous Transfemoral, Transseptal Implantation

(56) References Cited

OTHER PUBLICATIONS

With Its Second Generation Transcatheter Bioprosthetic Mitral Heart Valve," Jun. 23, 2015, p. 1, 3 Pages, [Retrieved on Feb. 5, 2016], Retrieved From URL: www.biospace.com/News/cardiaq-valve-technologies-cvt-reports-first- in/382370.
Boudjemline Y., et al., "Steps Toward the Percutaneous Replacement of Atrioventricular Valves," Journal of the American College of Cardiology, Jul. 19, 2005, vol. 46, No. 2, pp. 360-365.
Chiam P.T.L., et al., "Percutaneous Transcatheter Aortic Valve Implantation: Assessing Results, Judging Outcomes, and Planning Trials," Journal of the American College of Cardiology, Cardiovascular Interventions, The American College of Cardiology Foundation, Aug. 2008, vol. 1, No. 4, pp. 341-350.
Condado J.A., et al., "Percutaneous Treatment of Heart Valves," Spanish Journal of Cardiology (Revista Española de Cardiología), Applicant believes this may have been available as early as Dec. 2006, vol. 59, No. 12, pp. 1225-1231.
De Backer O., et al., "Percutaneous Transcatheter Mitral Valve Replacement—An Overview of Devices in Preclinical and Early Clinical Evaluation," Contemporary Reviews in Interventional Cardiology, Circulation: Cardiovascular Interventions, Jun. 2014, vol. 7, pp. 400-409.
Dotter C.T., et al., "Transluminal Treatment of Arteriosclerotic Obstruction: Description of a New Technic and a Preliminary Report of Its Application," Circulation, Lippincott Williams & Wilkins, Philadelphia, PA, Nov. 1, 1964, vol. XXX, No. 30, pp. 654-670.
Feldman T., et al., "Prospects for Percutaneous Valve Therapies," Circulation, 2007, vol. 116, pp. 2866-2877 (13 Pages), Applicant believes that this may be available as early as Dec. 11, 2007. With Enlarged Figure 2.
Fitzgerald P.J., "Tomorrow's Technology: Percutaneous mitral valve replacement, chordal shortening, and beyond," Transcatheter Valve Therapies (TVT) Conference, Jun. 7, 2010, 25 pages, Seattle, Washington.
Fornell D., "Transcatheter Mitral Valve Replacement Devices in Development," Diagnostic and Interventional Cardiology, Dec. 30, 2014, p. 3 (5 Pages), [Retrieved on Feb. 5, 2016], Retrieved from URL: http://www.dicardiology.com/article/transcatheter-mitral-valve-replacement-devices-development.
Grube E., et al., "Percutaneous Aortic Valve Replacement for Severe Aortic Stenosis in High-risk Patients Using the Second- and Current Third-generation Self-expanding Corevalve Prosthesis: Device Success and 30-day Clinical Dutcome," Journal of the American College of Cardiology, Jul. 3, 2007, vol. 50, No. 1, pp. 69-76, E-Published on Jun. 6, 2007.
Herrmann, Howard C., M.D., "Advances in Transseptal Transcatheter Mitral Valve Replacement," Cardiovascular Research Foundation, tct, Sep. 21-25, 2018, 10 Pages, San Diego, California.
Inoue K., et al., "Clinical Application of Transvenous Mitral Commissurotomy by a New Balloon Catheter," The Journal of Thoracic and Cardiovascular Surgery, Mar. 1984, vol. 87, No. 3, pp. 394-402 (10 Pages).
Karimi, Houshang, et al., "Percutaneous Valve Therapies," SIS 2007 Yearbook, Chapter 11, pp. 1-11.
Kronemyer B., "CardiAQ Valve Technologies: Percutaneous Mitral Valve Replacement," Start Up—Windhover Review of Emerging Medical Ventures, Jun. 2009, vol. 14, No. 6, pp. 48-49 (3 Pages).
Leon M.B., et al., "Transcatheter Aortic Valve Replacement in Patients with Critical Aortic Stenosis: Rationale, Device Descriptions, Early Clinical Experiences, and Perspectives," Seminars in Thoracic and Cardiovascular Surgery, 2006 (Applicant believes this may have been available as early as the Summer of 2006), vol. 18, pp. 165-174.
Lutter G., et al., "Off-Pump Transapical Mitral Valve Replacement," European Journal of Cardio-Thoracic Surgery, Apr. 25, 2009, vol. 36, No. 1, pp. 124-128.
Ma L., et al., "Double-crowned Valved Stents for Off-pump Mitral Valve Replacement," European Journal of Cardio-thoracic Surgery, 2005, vol. 28, No. 2, pp. 194-199, Discussion 198-9, (Aug. 2008).

Mack, Michael M.D., "Antegrade Transcatheter Mitral Valve Implantation: A Short-term Experience in Swine Model", TVT, Sep. 2011, 10 pages, Washington D.C.
Mack, Michael M.D., "Antegrade Transcatheter Mitral Valve Implantation: On-Going Experience in Swine Model," TVT, Sep. 2011,16 Pages, Washington D.C.
Neale, Todd, "Flushing TAVI Valves With Carbon Dioxide May Protect Against Brain Injury", News Conference News, EuroPCR 2023, TCTMD, May 16, 2023, Paris France.
NEOVASC: Neovasc Corporate Presentation, Oct. 2009, 21 Pages, Retrieved from URL: http://www.neovasc.com/investors/documents/Neovasc-Corporate-Presentation-October-2009.pdf.
Ostrovsky G., "Transcatheter Mitral Valve Implantation Technology from CardiAQ," medGadget, Jan. 15, 2010, 4 Pages, [Retrieved On Mar. 5, 2015], Retrieved from URL: http://www.medgadget.com/2010/01/transcatheter_mitral_valve_implantation_technology_from_cardiaq.html, Accessed On Jun. 27, 2012.
Pavcnik D., et al., "Development and Initial Experimental Evaluation of a Prosthetic Aortic Valve for Transcatheter Placement," Cardiovascular Radiology, Apr. 1, 1992, vol. 183(1), pp. 151-154.
Preston-Maher G.L., et al., "A Technical Review of Minimally Invasive Mitral Valve Replacements," Cardiovascular Engineering and Technology, Jun. 2015, vol. 6, No. 2, pp. 174-184, E-Published on Nov. 25, 2014.
Quadri, Arshad., M.D., "Transcatheter Mitral Valve Implantation (TMVI) (An Acute In Vivo Study)," Sep. 21-25, 2010, pp. 1-19, TCT, Washington, D.C.
Ratz B., "Any Experiences Making an Expandable Stent Frame?," Forums: Modeling, Multiple Forum Postings, Feb. 3, 2009, 5 Pages, [Retrieved on Aug. 11, 2016] Retrieved from URL: http://www.arch-pub.com/Any-experiences-making-an-expandable-stent-frame_10601513.html.
Ratz B.J., "Lsi Emt Spotlight," CardiAQ Valve Technologies, Percutaneous Mitral Valve Replacement, May 15, 2009, pp. 1-21.
Ratz J.B., "In3 Company Overview," CardiAQ Valve Technologies, Percutaneous Mitral Valve Replacement, Jun. 24, 2009, pp. 1-15.
Ratz J.B., "Innovations in Heart Valve Therapy," CardiAQ Valve Technologies, In3 San Francisco, Jun. 18, 2008, 19 Pages, PowerPoint presentation in 19 slides.
Rosch J., et al., "The Birth, Early Years and Future of Interventional Radiology," Journal of Vascular and Interventional Radiology, Jul. 2003, vol. 14, No. 7, pp. 841-853.
Ross, "Aortic Valve Surgery," Surgery of the Arotic Valves, Guy's Hospital, London, At a meeting of the Council on Aug. 4, 1966. pp. 192-197.
Ruiz et al., "Glimpse into the Future New Transcatheter Mitral Valve Treatment, Overview of Novel Transcatheter Valve Technologies," May 25-28, 2010, 14 pages, EuroPCR 2010, Paris France.
Sabbah et al., "Mechanical Factors in the Degeneration of Porcine Bioprosthetic Valves: An Overview", Journal of Cardiac Surgery, vol. 4, No. 4, pp. 302-309, Dec. 1989.
Sondergaard L., et al., "Transcatheter Mitral Valve Implantation: CardiAQ(TM)," Cardiovascular Research Foundation, 2013, 16 Pages, Applicant believes this may have been presented at TCT.
Sondergaard, Lars, "CardiAQ TMVR FIH—Generation 2," Cardiovascular Research Foundation, Jun. 2014, 23 pages, TVT, Vancouver, BC.
Spillner, J. et al., "New Sutureless 'Atrial- Mitral-Valve Prosthesis' For Minimally Invasive Mitral Valve Therapy," Textile Research Journal, 2010, in 7 pages, Applicant believes this may have been available as early as Aug. 9, 2010.
Taramasso M., et al., "New Devices for TAVI: Technologies and Initial Clinical Experiences," Nature Reviews Cardiology, Mar. 2014, vol. 11, pp. 157-167, [Retrieved on Jan. 21, 2014], Retrieved from URL: http://www.nature.com/nrcardio/journal/v11/n3/full/nrcardio.2013.221.htmlmessage-global=remove#access.
Transcatheter Aortic Valve Delivery Catheter System Compression Loading System, Medtronic CoreValveSystem, Medtronic Inc, 2014, 61 pages, Santa Ana, California.
Treede H., et al., "Transapical Transcatheter Aortic Valve Implantation Using the JenaValve(TM) System: Acute and 30-Day Results of the Multicentre CE-Mark Study," European Journal of Cardio-

(56) References Cited

OTHER PUBLICATIONS

Thoracic Surgery, Apr. 16, 2012, vol. 41, pp. e131-e138, Retrieved From URL: http://ejcts.oxfordjournals.org/content/41/6/e131.long.
Wayback Machine: "Transcatheter Mitral Stent/Valve Prosthetic," Cleveland Clinic Lerner Research Institute, Archived on Aug. 31, 2013, 2 Pages, [Retrieved On Jun. 23, 2016], Retrieved from URL: https://web.archive.org/web/20130831094624/http://mds.clevelandclinic.org/Portfolio.aspx?n=331.
Webb J.G., et al., "Transcatheter Aortic Valve Implantation: The Evolution Of Prostheses, Delivery Systems And Approaches," Archives of Cardiovascular Disease, 2012, vol. 105, pp. 153-159, 9 Applicant believes this may have been available as early as Mar. 16, 2012).
Wheatley D.J., "Valve Prostheses," Operative Surgery, 4th edition, 1986, pp. 415-424.

\* cited by examiner

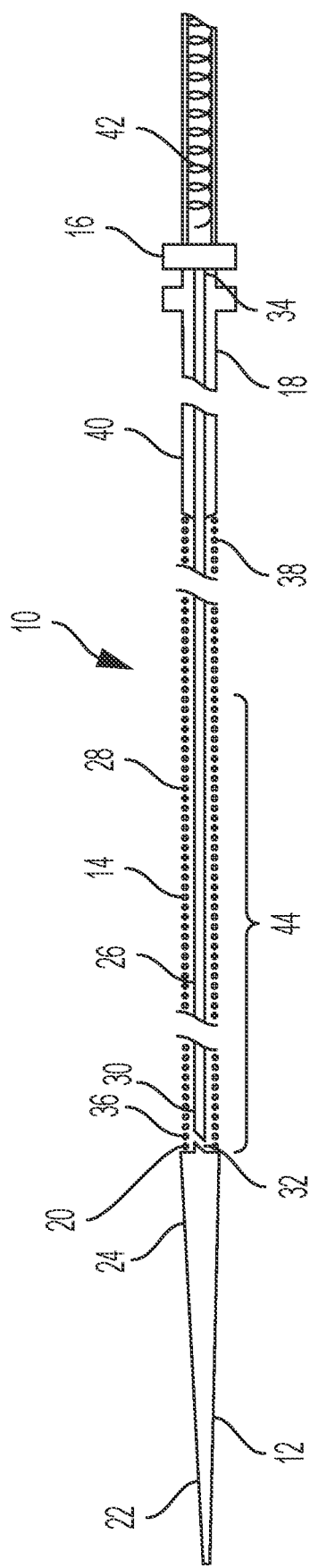
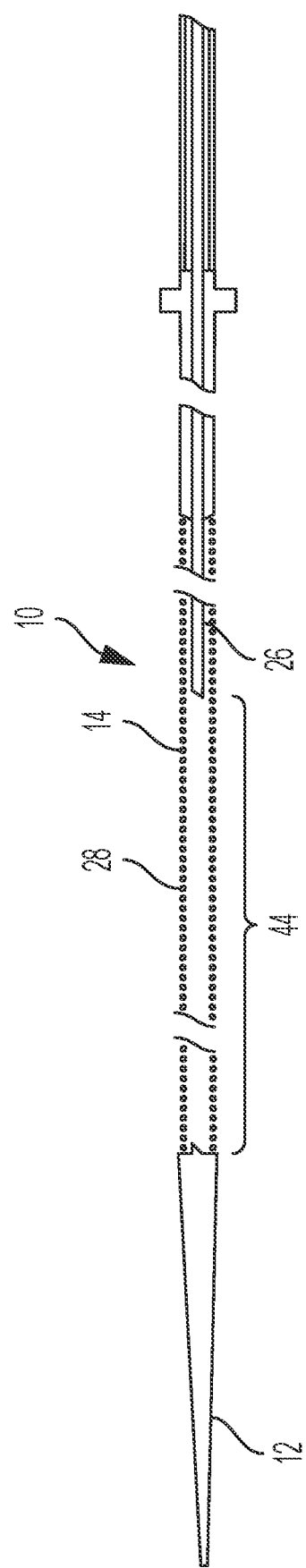
FIG. 1
FIG. 2

GUIDE WIRE APPARATUSES AND METHODS

CROSS REFERENCE TO RELATED APPLICATIONS

This application is a continuation of International Application No. PCT/US2020/012585, filed Jan. 7, 2020, which designates the United States and was published in English by the International Bureau on Aug. 13, 2020 as WO 2020/163031, which claims priority to U.S. Provisional App. No. 62/800,980, filed Feb. 4, 2019, the entirety of which is hereby incorporated by reference.

BACKGROUND

Field

Certain embodiments disclosed herein relate to guide wire apparatuses and methods. The guide wires may be utilized for guiding a delivery apparatus, for example a transcatheter mitral valve delivery apparatus to replace a native mitral valve.

Background

Human heart valves, which include the aortic, pulmonary, mitral and tricuspid valves, function essentially as one-way valves operating in synchronization with the pumping heart. The valves allow blood to flow downstream, but block blood from flowing upstream. Diseased heart valves exhibit impairments such as narrowing of the valve or regurgitation, which inhibit the valves' ability to control blood flow. Such impairments reduce the heart's blood-pumping efficiency and can be a debilitating and life-threatening condition. For example, valve insufficiency can lead to conditions such as heart hypertrophy and dilation of the ventricle. Thus, extensive efforts have been made to develop methods and apparatuses to repair or replace impaired heart valves.

Prostheses exist to correct problems associated with impaired heart valves. For example, mechanical and tissue-based heart valve prostheses can be used to replace impaired native heart valves. More recently, substantial effort has been dedicated to developing replacement heart valves, particularly tissue-based replacement heart valves that can be delivered with less trauma to the patient than through open heart surgery. Replacement valves are being designed to be delivered through minimally invasive procedures and even percutaneous procedures. Such replacement valves often include a tissue-based valve body that is connected to an expandable frame that is then delivered to the native valve's annulus.

Development of prostheses including but not limited to replacement heart valves that can be compacted for delivery and then controllably expanded for controlled placement has proven to be particularly challenging. An additional challenge relates to the ability of such prosthesis to be secured relative to intralumenal tissue, e.g., tissue within any body lumen or cavity, in an atraumatic manner.

Delivering a prosthesis to a desired location in the human body, for example delivering a replacement heart valve to the mitral valve, can be challenging. It can be challenging to direct a delivery apparatus through tortuous vasculature to reach the desired location. A similar challenge exists to provide a guide wire that can be utilized through that tortuous vasculature and can address the particular challenges of native heart geometry and structure.

SUMMARY

Embodiments of the present disclosure are directed to guide wire apparatuses and methods. The guide wires may be utilized to guide a delivery apparatus or other device to a desired location within a patient's body. In some embodiments, the guide wires may be utilized to guide a delivery apparatus or other device for transcatheter delivery, which may include transfemoral delivery or other forms of delivery (e.g., transjugular or transapical delivery). The entry into the body may be percutaneous in certain embodiments. In some embodiments, the delivery apparatus may be for transcatheter delivery of a prosthetic device, such as a prosthetic heart valve. The prosthetic heart valve may particularly be a prosthetic mitral valve, although guide wires and methods disclosed herein may be utilized to deliver a tricuspid valve, or other form of valve as appropriate. A transseptal approach may be utilized to access the mitral valve. The guide wires and methods disclosed herein may be utilized for transcatheter mitral valve replacement or repair as appropriate.

Embodiments of the present disclosure are directed to a guide wire that may include a core body having a length. An outer layer may have a length and may extend around the core body and along the length of the core body. An intermediate layer may be positioned between the core body and the outer layer and configured to be retracted relative to the core body and the outer layer along the length of the core body and the length of the outer layer.

Embodiments of the present disclosure are directed to a method including passing a guide wire into a left atrium and a left ventricle of a patient's heart. The method may include retracting a portion of the guide wire to increase a flexibility of the guide wire. The method may include passing a mitral valve delivery apparatus over the guide wire.

Embodiments of the present disclosure are directed to a method including passing a guide wire into a left atrium of a patient's heart, a portion of the guide wire having a preformed shape configured such that the guide wire deflects from the left atrium into a left ventricle of the patient's heart.

Embodiments of the present disclosure are directed to a guide wire that may include a distal portion, a proximal portion, and an intermediate portion positioned between and adjacent to the distal portion and the proximal portion and having a stiffness that is reduced from a stiffness of the distal portion and reduced from a stiffness of the proximal portion.

Embodiments of the present disclosure are directed to a method including passing a guide wire into a left atrium of a patient's heart, the guide wire including an intermediate portion that is more flexible than an adjacent proximal portion of the guide wire and more flexible than an adjacent distal portion of the guide wire. The method may include passing a mitral valve delivery apparatus over the guide wire. The method may include bending the intermediate portion of the guide wire by bending a portion of the mitral valve delivery apparatus extending over the intermediate portion of the guide wire.

Embodiments of the present disclosure are directed to a guide wire that may include an elongate wire, and a distal tip coupled to the elongate wire and configured to move from an undeployed configuration to a deployed configuration in which the distal tip expands radially outward from the elongate wire in two radial dimensions of the elongate wire.

Embodiments of the present disclosure are directed to a method including passing a guide wire into a left atrium of a patient's heart, the guide wire including an elongate wire and a distal tip coupled to the elongate wire. The method may include expanding the distal tip of the guide wire from an undeployed configuration to a deployed configuration in which the distal tip expands radially outward from the elongate wire in two radial dimensions of the elongate wire. The method may include passing the distal tip of the guide wire in the deployed configuration through a portion of a left ventricle of the patient's heart.

Embodiments of the present disclosure are directed to a guide wire that may include a distal tip portion configured for insertion into a portion of a patient's body. The guide wire may include a proximal tip portion having a stiffness that is reduced from a stiffness of an adjacent portion of the guide wire distal of the proximal tip portion.

Embodiments of the present disclosure are directed to a packaging system. The packaging system may include a guide wire including a distal tip portion and a proximal tip portion, the distal tip portion being configured for insertion into a portion of a patient's body, and the proximal tip portion having a stiffness that is reduced from a stiffness of an adjacent portion of the guide wire distal of the proximal tip portion. The packaging system may include a retainer configured to store the guide wire.

Embodiments of the present disclosure are directed to a method including inserting a proximal tip portion of a guide wire into an opening of a retainer configured to store the guide wire, the proximal tip portion having a stiffness that is reduced from a stiffness of an adjacent portion of the guide wire distal of the proximal tip portion.

BRIEF DESCRIPTION OF THE DRAWINGS

Features and advantages of the systems, apparatuses, and methods as disclosed herein will become appreciated as the same become better understood with reference to the specification, claims, and appended drawings wherein:

FIG. 1 illustrates a cross sectional view of a guide wire according to an embodiment of the present disclosure.

FIG. 2 illustrates a cross sectional view of the guide wire shown in FIG. 1 with a core body retracted.

DETAILED DESCRIPTION

Figure 3:
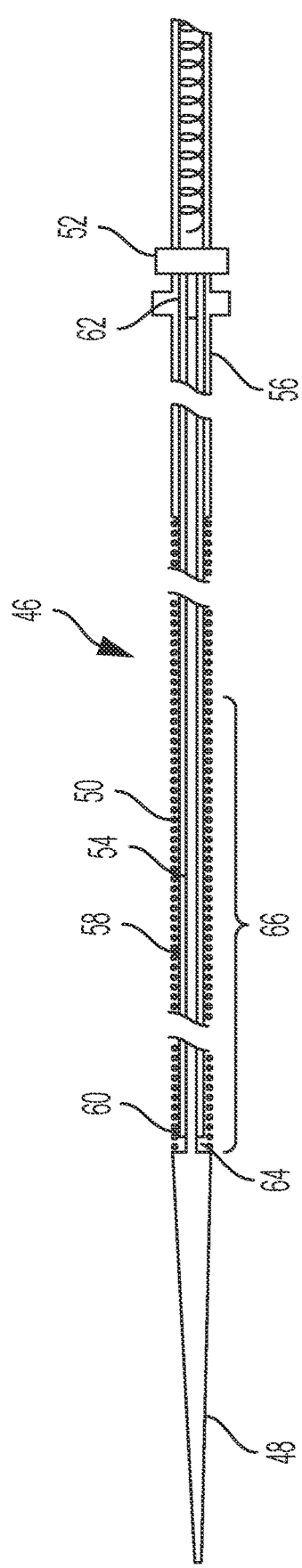
FIG. 3 illustrates a cross sectional view of a guide wire according to an embodiment of the present disclosure.

FIG. 1 illustrates a cross sectional view of a guide wire 10 according to an embodiment of the present disclosure. The guide wire 10 may include a distal tip 12 and an elongate wire 14 coupled to the distal tip 12 and extending proximally from the distal tip 12. An actuator 16 may be positioned at a proximal end 18 of the guide wire 10.

Figure 6:
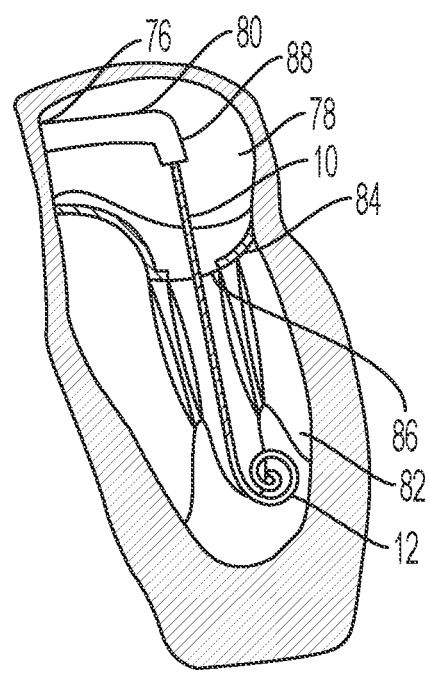
FIG. 6 illustrates a schematic view of a delivery catheter and guide wire positioned in a portion of a patient's heart according to an embodiment of the present disclosure.

The distal tip 12 may be positioned at a distal end 20 of the elongate wire 14. The distal tip 12 may have a tapered shape, tapering outward from a distal portion 22 of the distal tip to a proximal portion 24 of the distal tip 12 as shown in FIG. 1. In other embodiments, the distal tip 12 may have a different shape as desired. The distal tip 12 may be configured to form a shape, such as a pigtail shape as shown in FIG. 6, or other shape as desired. The distal tip 12 may be configured to form a shape that is atraumatic to a patient's heart tissue. The distal tip 12 may be flexible to prevent damage to a patient's heart tissue upon contact with the tissue. The distal tip 12 may comprise a unitary body as shown in FIG. 1, or may be formed of multiple components in other embodiments.

The elongate wire 14 may include a core body 26 and an outer layer 28 extending around the core body 26 and along the length of the core body 26. The core body 26 may have a length that extends along the length of the guide wire 10. The core body 26 may have an elongate shape and may extend from the distal tip 12 to the proximal end 18 of the guide wire 10 as shown in FIG. 1. The core body 26 may comprise a core wire that provides stiffness for the length of the guide wire 10.

The core body 26 may have a distal end 30 with a break 32 positioned between the core body 26 and the distal tip 12, or another portion of the guide wire 10. The break 32 may allow the core body 26 to move and retract relative to the distal tip 12 and the outer layer 28. A proximal end 34 of the core body 26 may couple to the actuator 16, to allow the actuator 16 to pull and retract the core body 26 along the length of the guide wire 10.

The outer layer 28 may have a length with a distal end 36 that couples to the distal tip 12 and a proximal end 38 that couples to the actuator 16 or to another portion 40 of the outer layer as shown in FIG. 1. The outer layer 28 may comprise a coil wrapped around the core body 26, or in other embodiments may have other configurations. The outer layer 28 may be configured to be flexible, and may be constructed to be more flexible than the portion of the core body 26 that the outer layer 28 surrounds. The adjacent portion 40 of the outer layer may comprise a sleeve or the like extending around a proximal portion of the core body 26.

The actuator 16 may couple to the proximal end 34 of the core body 26 and may comprise a device for retracting the core body 26 relative to the distal tip 12 and the outer layer 28. For example, the actuator 16 may comprise a retractable body, such as a plunger or handle or the like, as shown in FIG. 1, and may include a spring 42 for biasing the core body 26 towards the distal tip 12. In other embodiments, other devices may be utilized, whether motorized or hand operated.

The actuator 16 may be configured to retract the core body 26 a defined distance, by pulling the core body 26 by the defined distance.

As shown in FIG. 1, the core body 26 is in an advanced position, in which the core body is positioned within a region 44 of the guide wire 10 that will have an increased flexibility when the core body 26 is retracted. The core body 26 may be advanced to the distal tip 12, or another portion of the guide wire 10 in the advanced position.

In operation, the core body 26 may be retracted relative to the distal tip 12 and the outer layer 28 to form the region 44 of the guide wire 10 that has increased flexibility (or reduced stiffness) relative to the prior flexibility (or stiffness) of that region 44 with the core body present.

FIG. 2 illustrates the core body 26 having been retracted to a retracted position, to form the region 44 of the guide wire that has increased flexibility (or reduced stiffness). The actuator 16 has moved in a direction away from the distal tip 12 to retract the core body 26. The retraction of the core body 26 has formed the region 44 that does not include the core body 26, and that is positioned between the core body 26 and the distal tip 12. The region 44 accordingly has a lesser cross sectional area (the area occupied by the components of the guide wire 10) than the region 44 previously had due to the presence of the core body 26. Thus, the flexibility of the region 44 increases. Further, the outer layer 28 has a greater flexibility than the core body 26 (due to the relative stiffness of the core body 26) and thus the absence of the stiffer core body 26 in the region 44 increases the flexibility of the region 44.

The size of the region 44 may be determined by the desired length of retraction of the actuator 16.

The outer layer 28 may remain coupled to the distal tip 12, such that the distal tip 12 remains coupled to the elongate wire 14 and does not detach.

The core body 26 may be advanced back to the advanced position as shown in FIG. 1, to reduce the flexibility of the region 44. Thus, the region 44 may be a region of variable flexibility (and stiffness), and the size of the region 44 may be varied as desired.

FIG. 3 illustrates a cross sectional view of a guide wire 46 according to an embodiment of the present disclosure. The guide wire 46 may be configured similarly as the guide wire 10. For example, the distal tip 48, the outer layer 50, and the actuator 52 may be configured similarly as the respective structures 12, 28, 16 discussed in regard to FIGS. 1 and 2. However, the guide wire 46 may have different features as described below.

The core body 54 may be fixed in position relative to the distal tip 48 and the outer layer 50. For example, the core body 54 may be coupled to the distal tip 48 and may be coupled to a secure point at the proximal end 56 of the guide wire 46.

The guide wire 46 may include an intermediate layer 58 that is positioned between the outer layer 50 and the core body 54. The intermediate layer 58 may have a distal end 60 and a proximal end 62 and a length from the distal end 60 to the proximal end 62. The distal end 60 may include a break 64 that separates the intermediate layer 58 from the distal tip 48. The intermediate layer 58 may be configured to be retracted relative to the core body 54 and the outer layer 50 along the length of the core body 54 and the length of the outer layer 50. The break 64 may allow the intermediate layer 58 to move and retract relative to the core body 54, the outer layer 50, and the distal tip 48. The proximal end 62 may couple to the actuator 52, which may retract the intermediate layer 58 in a similar manner that the actuator 16 retracted the core body 26 in FIGS. 1 and 2.

As shown in FIG. 3, the intermediate layer 58 is in an advanced position, in which the intermediate layer 58 is positioned within a region 66 of the guide wire 46 that will have an increased flexibility when the intermediate layer 58 is retracted. The intermediate layer 58 may be advanced to the distal tip 48, or another portion of the guide wire 46 in the advanced position.

In operation, the intermediate layer 58 may be retracted relative to the distal tip 48 and the outer layer 50 and core body 54 to form a region 66 of the guide wire 46 that has increased flexibility (or reduced stiffness) relative to the prior flexibility (or stiffness) of that region 66 with the intermediate layer 58 present. The intermediate layer 58 may be configured to be retracted relative to the core body 54 and the outer layer 50 in a direction towards the proximal end 56 of the guide wire 46.

Figure 4:
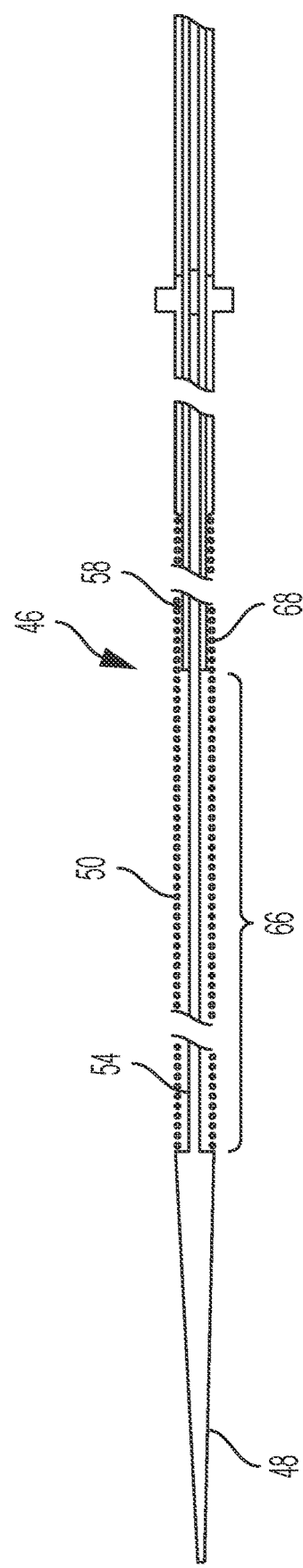
FIG. 4 illustrates a cross sectional view of the guide wire shown in FIG. 3 with an intermediate layer retracted.

FIG. 4 illustrates the intermediate layer 58 having been retracted to a retracted position, to form the region 66 of the guide wire 46 that has increased flexibility (or reduced stiffness). The actuator 52 has moved in a direction away from the distal tip 48 to retract the intermediate layer 58. The intermediate layer 58 is retracted from the region 66. The retraction of the intermediate layer 58 has formed the region 66 that does not include the intermediate layer 58, positioned between the intermediate layer 58 and the distal tip 48. The region 66 accordingly has a reduced cross sectional area (the area occupied by components of the guide wire 46) than the region 66 previously had due to the presence of the intermediate layer 58. Thus, the flexibility of the region 66 increases.

Figure 9:
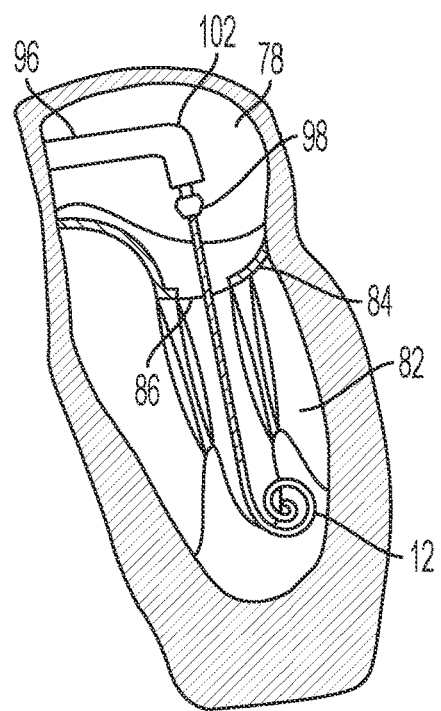
FIG. 9 illustrates a schematic view of a delivery apparatus and guide wire positioned in a portion of a patient's heart according to an embodiment of the present disclosure.

The presence of the core body 54, however, may not reduce the flexibility of the region 66 as much as the reduced flexibility of the region 44 shown in FIG. 2. Thus, the region 66 may retain a greater stiffness than the region 44 shown in FIG. 2, although not as much as with the intermediate layer 58 present in the region 66. Such a feature may beneficially allow the guide wire 46 at the region 66 to better support and guide a delivery apparatus that may be passed over the region 66 and may be bent at the region 66, as shown in FIG. 9. The presence of the core body 54 at the region 66 may also make the region 66 more resistant to kinking upon being bent.

The outer layer 50 and core body 54 may remain coupled to the distal tip 48, such that the distal tip 48 remains coupled to the elongate wire 68 and does not detach.

The intermediate layer 58 may be configured to be advanced back to the advanced position as shown in FIG. 3, to reduce the flexibility of the region 66. The intermediate layer 58 may be advanced relative to the core body 54 and the outer layer 50 in a direction towards the distal tip 48. The region 66 may be a region of variable flexibility (and stiffness), and the size of the region 66 may be varied as desired.

The size of the region 66 may be determined by the desired length of retraction of the actuator 52.

The size of the respective regions 44, 66 of the guide wires 10, 46 may be a proportion of the total length of the guide wires 10, 46. For example, the size of the region 44, 66 in one embodiment may be between 5% and 10% of the total length of the respective guide wire 10, 46. In one embodiment, the size of the respective region 44, 66 may be a set amount, for example, between a length of 20 and 25 centimeters. In one embodiment, a greater or lesser size of the region 44, 66 may be utilized. In one embodiment, the length of each of the respective guide wires 10, 46 may be approximately 300 centimeters. In other embodiments, a greater or lesser length may be utilized.

The construction of the guide wires 10, 46 may include a variety of materials. In one embodiment the guide wire 10 may utilize a nitinol core body 26, or core wire, with a nitinol outer layer 28, or coil. In one embodiment, the guide wire 46 may utilize a nitinol core body 54, or core wire, with the intermediate layer 58 comprising a hypotube such as a hypotube jacket, and a nitinol outer layer 50, or coil. The hypotube of the intermediate layer 58 may be made of stainless steel in one embodiment. In other embodiments, other materials may be utilized to construct the guide wires 10, 46.

The dimensions of the guide wires 10, 46 may be set as desired. In one embodiment, an outer diameter of the guide wires 10, 46 may be about or less than 0.035 inches. In other embodiments, different dimensions may be utilized. In one embodiment, the distal tip 48 of guide wire 46 may taper from a diameter of 0.007 inches at a distal end to 0.018 inches at a proximal end. The core body 54 may taper down from the diameter of the distal end of the distal tip 48 to an outer diameter of 0.013 inches. The intermediate layer 58 may have an inner diameter of 0.014 inches, and an outer diameter of 0.0268 inches. The outer layer 50 may have an outer diameter of 0.035 inches. In other embodiments, other dimensions may be utilized.

In other embodiments, the guide wires 10, 46 may have different configurations than shown in FIGS. 1-4.

FIGS. 5-12 illustrates steps and components of a method that may utilize the guide wires 10, 46. The guide wires 10, 46 may be utilized to guide a delivery apparatus to a portion of a patient's body. The portion of the patient's body may comprise the patient's heart 70, and may particularly comprise the mitral valve of the patient's heart according to embodiments herein. The guide wire 10, 46 may form a guide path for the delivery apparatus to follow to deliver a prosthetic device to the desired portion of the patient's heart 70, which may comprise a prosthetic mitral valve or other device according to embodiments herein.

Figure 5:
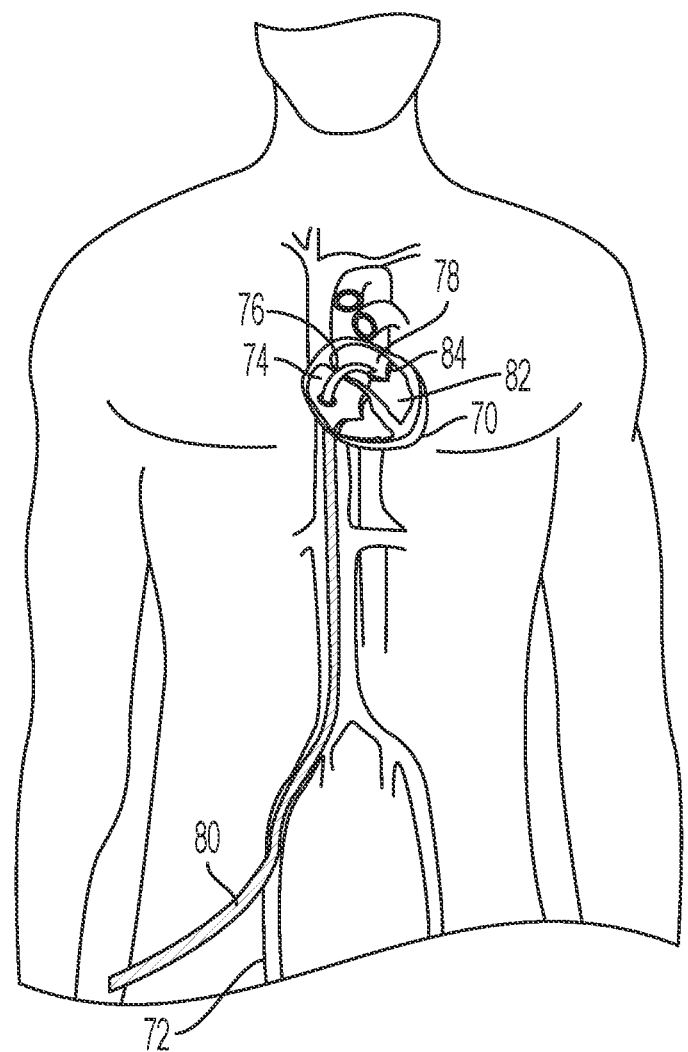
FIG. 5 illustrates a schematic view of a delivery catheter passed through a patient's vasculature to a patient's heart according to an embodiment of the present disclosure.

FIG. 5 illustrates a method of introducing the guide wire into the patient's body. The guide wire may be introduced percutaneously if desired. The guide wire may be introduced into the patient's body in a process of entering the patient's vasculature 72 with a puncture device, such as a puncture catheter that is passed through the vasculature 72, through the inferior vena cava, and into the right atrium 74 of the patient's heart 70. The puncture device may be inserted transfemorally, as shown in FIG. 5, or through another entry point. The puncture device may be passed to the right atrium 74 to form a transseptal puncture, or hole 76, in the atrial septum to the left atrium 78 of the patient's heart 70. The puncture device may then be removed from the patient's body and a delivery catheter 80 as shown in FIG. 5 may be passed along the path that the puncture device took to the transseptal hole 76.

Figure 8:
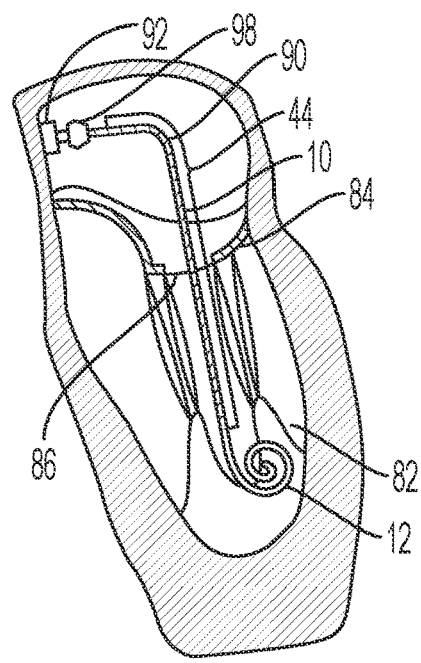
FIG. 8 illustrates a schematic view of a delivery apparatus and guide wire positioned in a portion of a patient's heart according to an embodiment of the present disclosure.

The delivery catheter 80 may then pass through the transseptal hole 76 and into the left atrium 78, as shown in FIGS. 5 and 6. A guide wire 10, 46 (although guide wire 10 is indicated in FIGS. 6, 8, and 9, the same process may be utilized with guide wire 46) may be passed through the delivery catheter 80 and into the left atrium 78. A variety of other methods may be utilized to pass the guide wire 10 into the left atrium 78 in other embodiments.

The geometry of the left ventricle 82 and the mitral valve 84 relative to the transseptal hole 76 may require the guide wire 10 to be bent from the entry point of the atrial septum towards the left ventricle 82. FIG. 6 illustrates a cross sectional representation of the left atrium 78 and left ventricle 82 of a patient's heart. The entry point of the atrial septum may be angled from the entry of the mitral annulus 86, as shown in FIG. 6.

Referring to FIG. 6, the delivery catheter 80 may comprise a steerable catheter, and may be configured with a steerable end 88, that may angle the exit of the guide wire 10 from the delivery catheter 80 to a desired orientation. In one embodiment, the delivery catheter 80 may not have steerable end, but may be shaped with an angled exit opening, such that the guide wire 10 may be directed to a desired orientation in the left ventricle 82 of the patient's heart 70.

The guide wire 10 may be passed through the delivery catheter 80 and into the left atrium 78 and left ventricle 82 of the patient's heart. The guide wire 10 may be passed into the left atrium of the patient's heart with the core body 26 (for the embodiment shown in FIGS. 1 and 2) in the advanced position, or with the region 44 having a relatively high stiffness than with the core body 26 in the retracted position. For the embodiment of guide wire 46 shown in FIGS. 3 and 4, the intermediate layer 58 may similarly be in the advanced position. The relatively high stiffness of the respective regions 44, 66 may allow the respective guide wire 10, 46 to better penetrate and pass into the left atrium 78 of the patient's heart through the delivery catheter.

The guide wire 10 may be bent by the delivery catheter 80 at an angle to pass through the mitral annulus 86 and into the left ventricle 82. The angle of bend 90 (as shown in FIG. 8) may be at about ninety degrees or may be a greater or lesser angle as desired. The bending may be in one radial dimension of the guide wire 10 or may be in two radial dimensions of the guide wire (radial dimensions of a guide wire are marked in FIG. 27).

The distal tip 12 of the guide wire 10 may first exit the delivery catheter 80 and may form the expanded pigtail shape of the respective distal tip 12. The guide wire 10 may then be advanced through the delivery catheter 80 and from the left atrium 78 through the mitral annulus 86 and into the left ventricle 82.

Upon being passed out of the delivery catheter 80, the core body 26 (for the embodiment shown in FIGS. 1 and 2) or the intermediate layer 58 (for the embodiment shown in FIGS. 3 and 4) may be in the advanced position. The relatively high stiffness of the respective regions 44, 66 may allow the guide wire 10, 46 to better penetrate and pass through the mitral annulus 86 and into the left ventricle 82 of the patient's heart. In one embodiment, however, the core body 26 (for the embodiment shown in FIGS. 1 and 2) or the intermediate layer 58 (for the embodiment shown in FIGS. 3 and 4) may retract to the retracted position to better allow the respective guide wire 10, 46 to bend through the bent portion (e.g., the steerable end 88) of the delivery catheter 80. The user may retract a portion (e.g., the core body 26 or the intermediate layer 58) of the respective guide wire 10, 46 to increase a flexibility of the guide wire 10, 46.

The delivery catheter 80 may be withdrawn from the guide wire 10 and removed from the patient's body upon the guide wire 10 reaching the desired position in the left ventricle 82 (for example, a position as shown in FIG. 6).

A mitral valve delivery apparatus may then be passed over the guide wire 10 and may follow a similar path as the delivery catheter 80 shown in FIG. 5.

Figure 7:
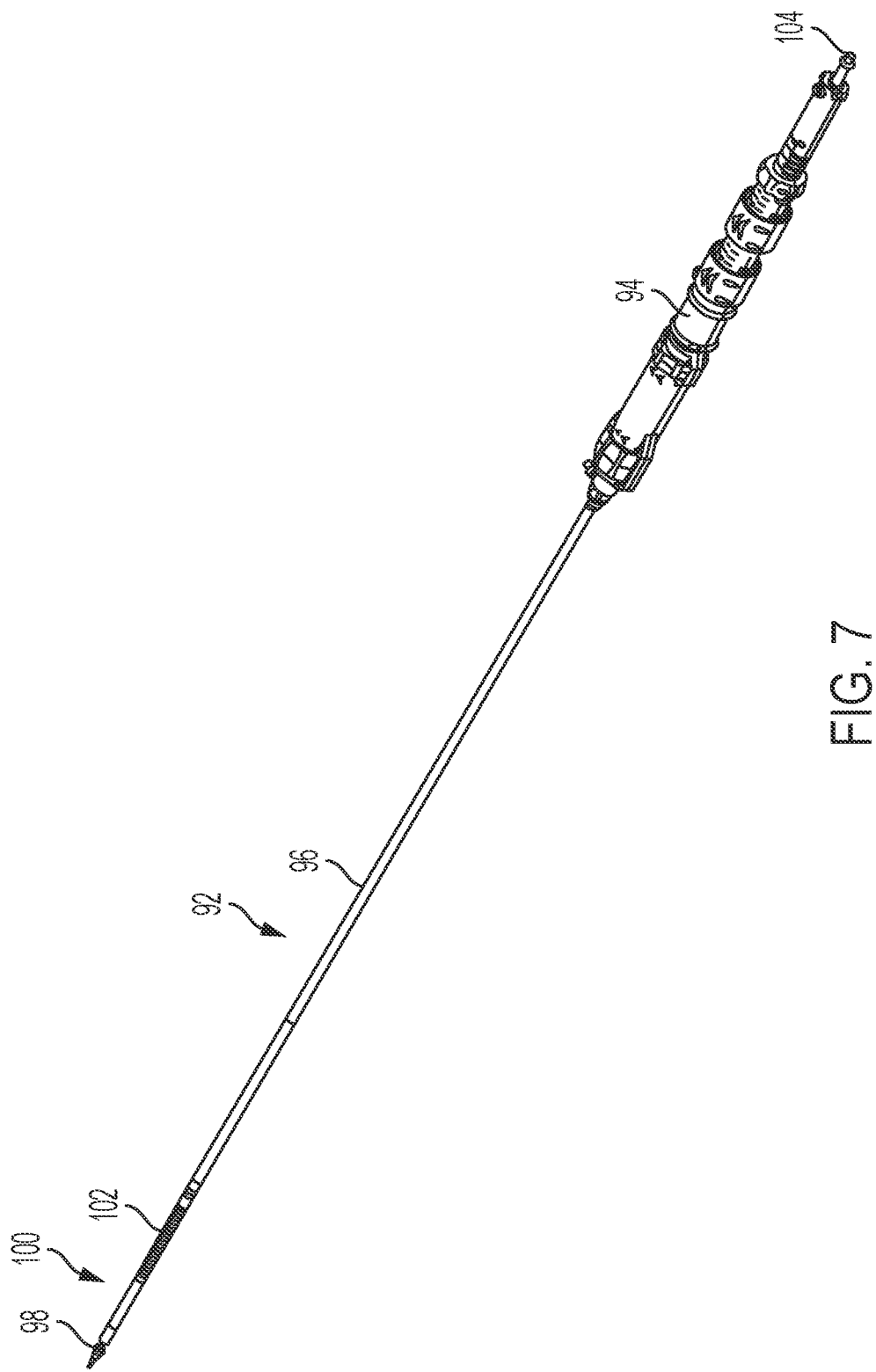
FIG. 7 illustrates a perspective view of a transcatheter mitral valve delivery apparatus according to an embodiment of the present disclosure.

FIG. 7 illustrates a perspective view of an embodiment of a mitral valve delivery apparatus 92 that may be utilized according to embodiments herein. The mitral valve delivery apparatus 92 may include a handle 94 and an elongate shaft 96 with a nose cone 98. A delivery capsule 100 may be positioned at a distal portion of the delivery apparatus 92 and may hold a prosthetic mitral valve for implantation to replace the patient's native mitral valve. The mitral valve delivery apparatus 92 may include a steerable portion 102 that may bend the shaft 96 of the delivery apparatus 92. The steerable portion 102 may bend to account for the relative angle between the position of the transseptal hole 76 and the entry of the mitral annulus 86 show in FIG. 6. The mitral valve delivery apparatus 92 may include a central opening 104 for the guide wire 10, 46 to pass through as the mitral valve delivery apparatus 92 is passed over the guide wire 10, 46. In other embodiments, other forms of delivery apparatuses may be utilized.

Referring to FIG. 8, the mitral valve delivery apparatus 92 may pass along the guide wire 10 and approach the region 44 of the guide wire 10 that has the variable flexibility. As the guide wire 10 passes into the left atrium and approaches the region 44, the guide wire 10 may remain in the advanced position. However, at this point, or prior to this point, the respective core body 26 or the intermediate layer 58 of the guide wire 10, 46 may be retracted from the advanced position to the retracted position to increase the flexibility of the region 44, 66 of the guide wire. The increased flexibility of the region 44, 66 may allow the mitral valve delivery apparatus 92 to more easily bend using the steerable portion 102 of the mitral valve delivery apparatus 92. The increased flexibility of the region 44, 66 may reduce the force that the mitral valve delivery apparatus 92 must overcome to bend towards the mitral valve annulus 86. The mitral valve delivery apparatus 92 may be used to bend the guide wire 10, 46 at the region 44, 66 after the respective core body 26 or the intermediate layer 58 of the guide wire 10, 46 has been retracted.

Referring to FIG. 9, the steerable portion 102 of the mitral valve delivery apparatus 92 has bent and is directed towards the mitral valve annulus 86. At this point, the stiffness of the region 44, 66 may be increased by moving the respective core body 26 or the intermediate layer 58 towards the respective distal tip 12, 48 of the guide wire 10, 46, or the region 44, 66 of the guide wire 10, 46 may remain with a reduced stiffness. If the stiffness of the respective region 44, 66 is increased, the guide wire 10, 46 may better serve to guide the distal portion (e.g. nose cone 98) of the mitral valve delivery apparatus 92 into the left ventricle 82. If the stiffness of the respective region 44, 66 remains reduced, then the steerable portion 102 of the mitral valve delivery apparatus 92 may continue to experience a reduced stiffness at the bend point of the mitral valve delivery apparatus 92.

Figure 10:
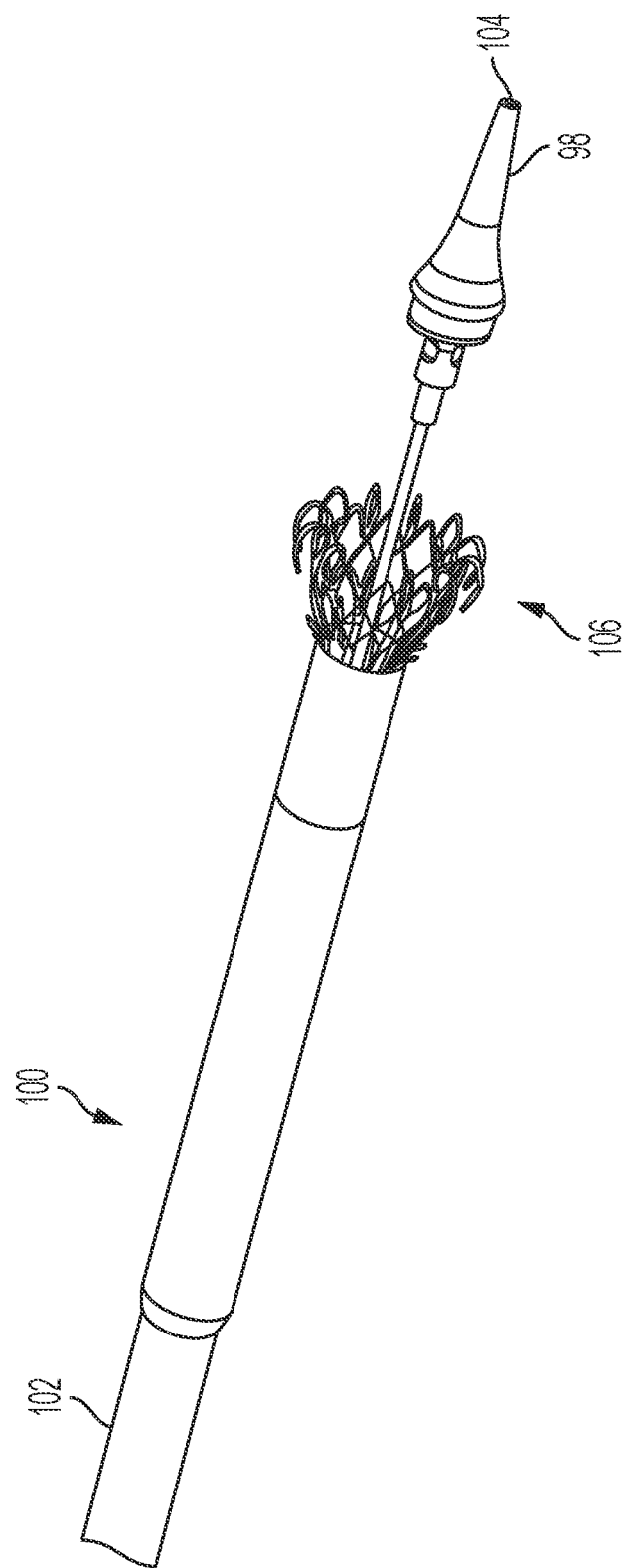
FIG. 10 illustrates a perspective view of a prosthetic mitral valve deploying from a delivery apparatus according to an embodiment of the present disclosure.

The distal portion of the mitral valve delivery apparatus 92 may be advanced along the guide wire 10 into the left ventricle 82 of the patient. Referring to FIG. 10, the nose cone 98 of the mitral valve delivery apparatus 92 may be advanced along the guide wire 10 relative to the delivery capsule 100 to allow the prosthetic mitral valve 106 to be deployed out of the delivery capsule 100.

Figure 11:
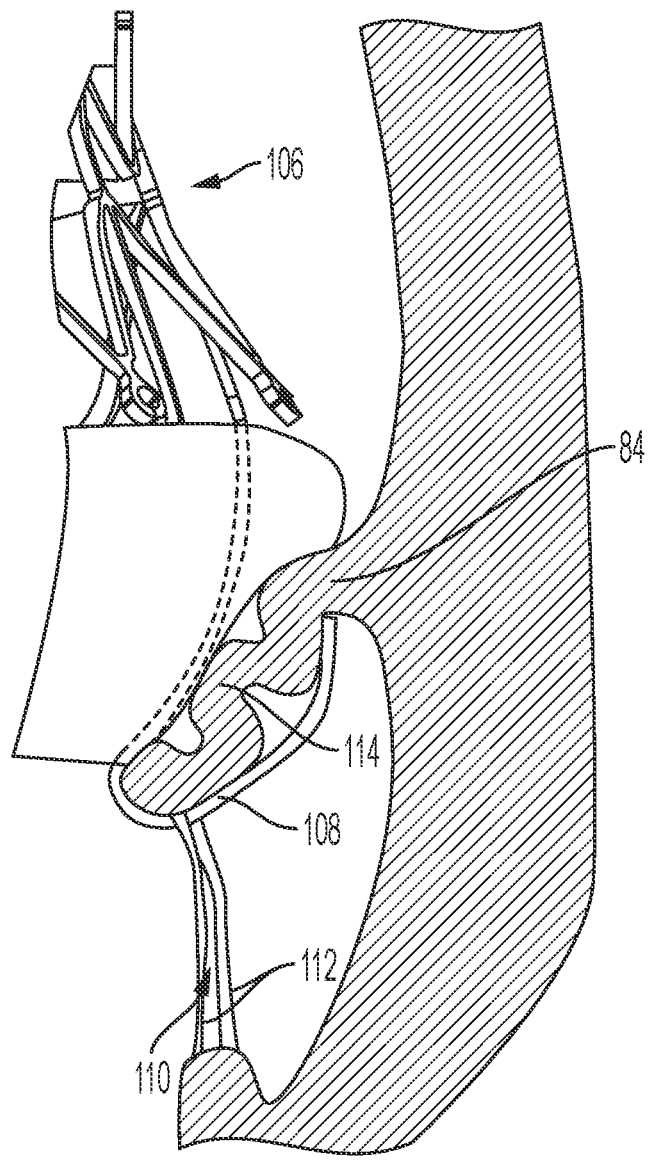
FIG. 11 illustrates a section of a schematic view of a prosthetic mitral valve deployed to a native mitral valve according to an embodiment of the present disclosure.

Referring to FIG. 11, arms 108 of the prosthetic mitral valve 106 may pass between openings 110 of adjacent chordae tendineae 112 and may engage flaps 114 of the native mitral valve 84.

Figure 12:
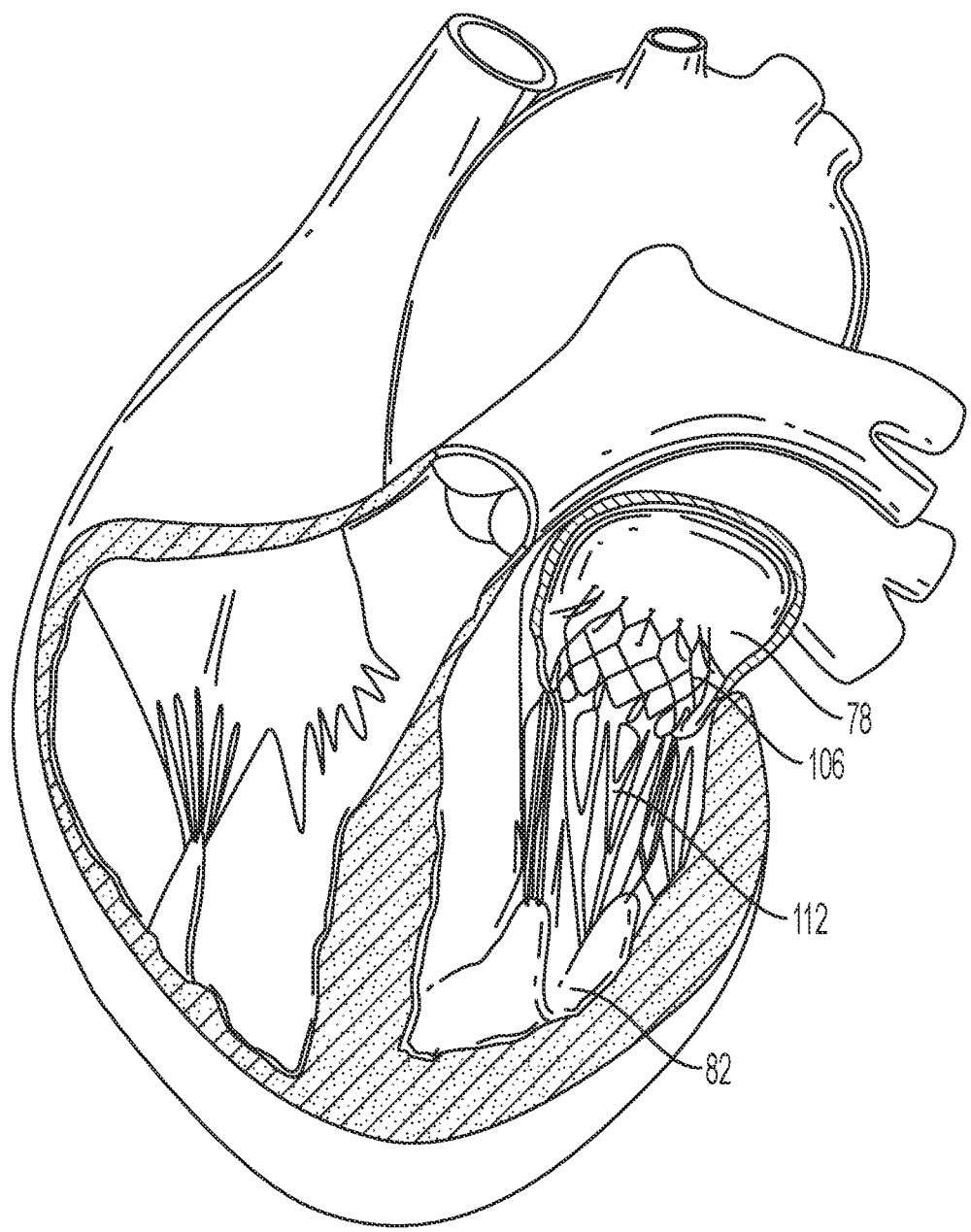
FIG. 12 illustrates a schematic view of a prosthetic mitral valve deployed to a native mitral valve according to an embodiment of the present disclosure.

The prosthetic mitral valve 106 may be implanted and have a position as shown in FIG. 12.

The guide wires 10, 46 may be withdrawn from the left ventricle 82 and left atrium 78 in a variety of methods. For example, after the mitral valve delivery apparatus 92 is withdrawn, the delivery catheter 80 (as shown in FIG. 6) may be reinserted into the left atrium 78 to retrieve the guide wire 10, 46 in a reverse operation than the insertion of the guide wire 10, 46 into the left ventricle 82 and left atrium 78. In another embodiment, another device such as a device for closing the transseptal hole 76 may be utilized to withdraw the guide wire 10, 46. For example, the guide wire 10, 46 may be left in the left atrium after the prosthetic mitral valve 106 is implanted and the mitral valve delivery apparatus 92 is removed. If a user chooses to close the transseptal hole 76 (using an amplatzer closure device, or other device, for example), then the guide wire 10, 46 may be utilized to guide such a device, and a wire exchange step may be saved. The guide wire 10, 46 may then be removed. In other embodiments, other methods may be utilized to withdraw the respective guide wire 10, 46.

The components and steps of the method shown in FIGS. 5-12 may be varied in other embodiments as desired.

Figure 13:
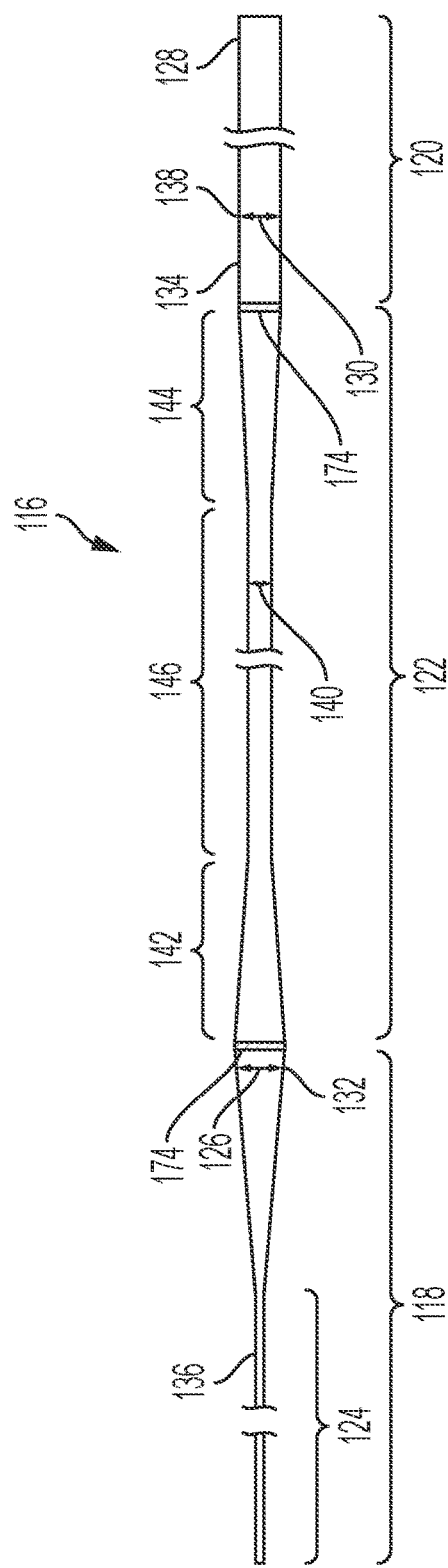
FIG. 13 illustrates a plan view of a guide wire according to an embodiment of the present disclosure.

FIG. 13 illustrates a plan view of a guide wire 116 according to an embodiment of the present disclosure. The guide wire 116 may include a distal portion 118, a proximal portion 120, and an intermediate portion 122. The intermediate portion 122 is positioned between and adjacent to the distal portion 118 and the proximal portion 120.

The distal portion 118 may include the distal tip 124 of the guide wire, which may be configured similarly as the distal tips 12, 48 discussed in regard to FIGS. 1-4. The distal portion 118 may extend proximally from the distal tip 124, and may have an elongate shape with a length. The distal portion 118 may be configured to have a taper, with a diameter 126 that increases in a direction away from the distal tip 124 as shown in FIG. 13. In other embodiments, the distal portion 118 may have other shapes or configurations.

The proximal portion 120 may extend from the intermediate portion 122 to the proximal end 128 of the guide wire 116. The proximal portion 120 may have an elongate shape with a length. The proximal portion 120 may have a constant diameter 130 or other configuration.

The intermediate portion 122 may couple to the proximal end 132 of the distal portion 118 and may couple to the distal end 134 of the proximal portion 120. The intermediate portion 122 may have a stiffness that is reduced from a stiffness of the distal portion 118 and reduced from a stiffness of the proximal portion 120. As such, the stiffness of the intermediate portion 122 decreases from a stiffness of the distal portion 118, such as the stiffness of the part of the distal portion 118 marked by reference no. 132 even though another part of the distal portion (for example, marked by reference no. 136) may have a stiffness that is less than the stiffness of the intermediate portion 122. Similarly, the stiffness of the intermediate portion 122 decreases from a stiffness of the proximal portion 120, such as the stiffness of the part of the proximal portion 120 marked by reference no. 138 even though another part of the proximal portion 120 may have a stiffness that is less than the stiffness of the intermediate portion 122.

The intermediate portion 122 may have a stiffness that is reduced from a stiffness of the distal portion 118 and reduced from a stiffness of the proximal portion 120 by a diameter 140 of the intermediate portion 122 being reduced from a diameter 126 of the distal portion 118 and reduced from a diameter 130 of the proximal portion 120. As such the diameter 140 of the intermediate portion 122 is reduced from the diameter at point 132 of the distal portion 118 and is reduced from the diameter at point 138 of the proximal portion 120.

The intermediate portion 122 may include a first transition region 142, a second transition region 144, and a central region 146. The central region 146 may be positioned between the first transition region 142 and the second transition region 144. The first transition region 142 may couple to the distal portion 118 and may have a stiffness that tapers downward in a direction away from the distal portion 118 and towards the central region 146. The first transition region 142 may have a diameter that tapers downward in a direction away from the distal portion 118 and towards the central region 146. The central region 146 may have a constant stiffness and a constant diameter, although the central region 146 may have a different stiffness or diameter as desired. The second transition region 144 may couple to the proximal portion 120 and may have a stiffness that tapers downward in a direction away from proximal portion 120 towards the central region 146. The second transition region 144 may have a diameter that tapers downward in a direction away from the proximal portion 120 and towards the central region 146.

The distal portion 118, the intermediate portion 122, and the proximal portion 120 may each comprise portions of the guide wire 116 comprising a core body of the guide wire 116. The core body of the intermediate portion 122 may have a diameter that is reduced from a diameter of the core body of the distal portion 118 and is reduced from a diameter of the core body of the proximal portion 120. The reduced diameter of the core body of the intermediate portion 122 may result in the reduced stiffness (or increased flexibility) of the intermediate portion 122. The first transition region 142 may taper downward in diameter from a diameter of the core body of the distal portion and the second transition region 144 may taper downward in diameter from a diameter of the core body of the proximal portion 120. The central region 146 may have a constant diameter, or other diameter as desired. In other embodiments, other portions of the guide wire 116 may have a reduced diameter to reduce a stiffness of the intermediate portion 122 of the guide wire 116. In one embodiment, the core body may comprise a core wire of the guide wire 116.

In one embodiment, an outer layer, such as an outer coil wire may extend over all or a portion of the guide wire 116. For example, an outer layer may extend over the intermediate portion 122 as desired.

Figure 14:
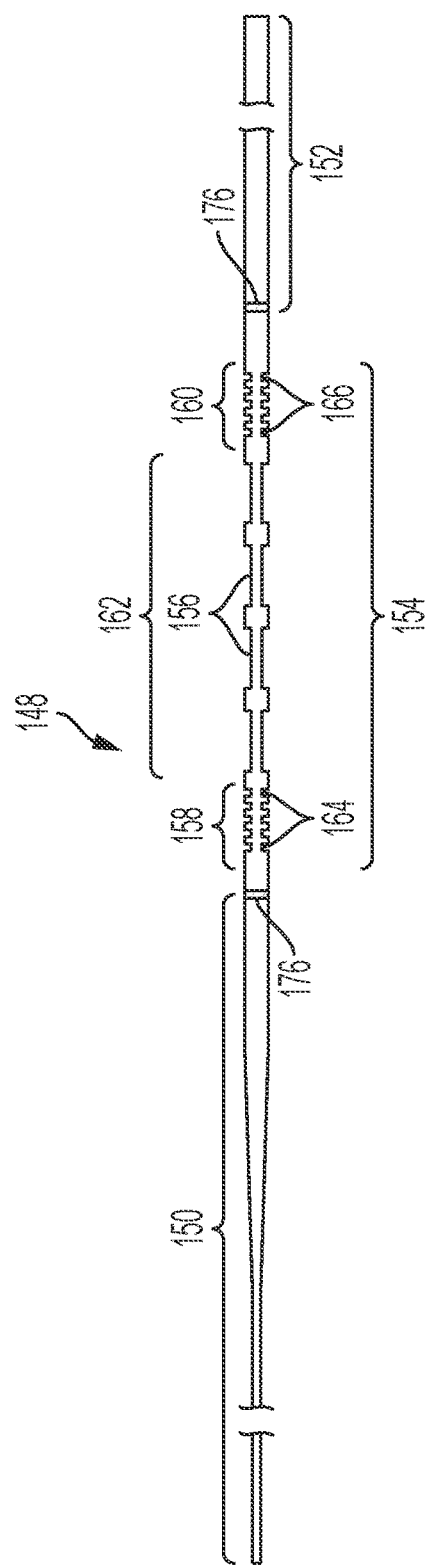
FIG. 14 illustrates a plan view of a guide wire according to an embodiment of the present disclosure.

FIG. 14 illustrates a side view of a guide wire 148 according to an embodiment of the present disclosure. The guide wire 148 may include a distal portion 150, a proximal portion 152, and an intermediate portion 154. The intermediate portion 154 is positioned between and adjacent to the distal portion 150 and the proximal portion 152. The distal portion 150 may be configured similarly as the distal portion 118 shown in FIG. 13. The proximal portion 152 may be configured similarly as the proximal portion 120 shown in FIG. 13.

The guide wire 148 may be configured similarly as the guide wire 116 shown in FIG. 13 as the guide wire 148 may have an intermediate portion 154 with a stiffness that is reduced from a stiffness of the distal portion 150 and reduced from a stiffness of the proximal portion 152. The intermediate portion 154, however, here may include a plurality of cuts 156 configured to provide flexibility of the intermediate portion 154 and that reduce the stiffness of the intermediate portion 154 from a stiffness of the distal portion 150 and from a stiffness of the proximal portion 152. The distal portion 150 and the proximal portion 152 may not include the cuts 156, as shown in FIG. 14.

The intermediate portion 154 may include a first transition region 158, a second transition region 160, and a central region 162. The central region 162 may be positioned between the first transition region 158 and the second transition region 160. The first transition region 158 may couple to the distal portion 150 and may have a stiffness that is reduced from the stiffness of the distal portion 150, yet is greater than the stiffness of the central region 162. The first transition region 158 may have such a stiffness by having cuts 164 that are sized smaller than the cuts 156 of the central region 162, or otherwise configured to have an intermediate stiffness between the distal portion 150 and the central region 162. The size and width of the plurality of cuts 164 along the length of the intermediate portion 154 may accordingly decrease in a direction from a central region 162 towards the distal portion 150. In one embodiment, the first transition region 158 may have a stiffness that tapers downward in a direction away from the distal portion 150 and towards the central region 162 due to the configuration of the cuts 164 in the first transition region 158. The configuration of cuts 164 may provide lesser flexibility of the intermediate portion 154 in a direction from the central region 162 towards the distal portion 150.

The central region 162 may have a constant stiffness and a constant configuration of cuts 156 (which may be larger than the cuts 164 of the first transition region 158 and the cuts 166 of the second transition region 160), although the central region 162 may have a different stiffness or configuration of cuts 156 in other embodiments as desired.

The second transition region 160 may couple to the proximal portion 152 and may have a stiffness that is reduced from the stiffness of the proximal portion 152, yet is greater than the stiffness of the central region 162. The second transition region 160 may have such a stiffness by having cuts 166 that are sized smaller than the cuts 156 of the central region 162, or otherwise configured to have an intermediate stiffness between the proximal portion 152 and the central region 162. The size and width of the plurality of cuts 166 along the length of the intermediate portion 154 may accordingly decrease in a direction from a central region 162 towards the proximal portion 152. In one embodiment, the second transition region 160 may have a stiffness that tapers downward in a direction away from the proximal portion 152 and towards the central region 162 due to the configuration of the cuts 166 in the second transition region 160. The configuration of cuts 166 may provide lesser flexibility of the intermediate portion 154 in a direction from the central region 162 towards the proximal portion 152.

Figure 15:
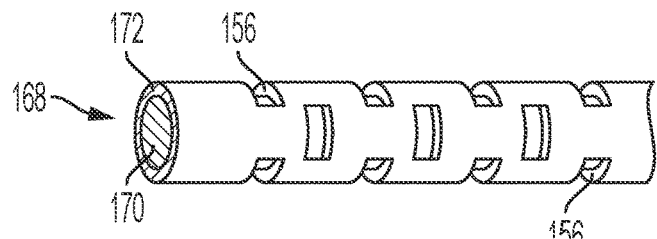
FIG. 15 illustrates a partial cross sectional view of a core body according to an embodiment of the present disclosure.

The distal portion 150, the intermediate portion 154, and the proximal portion 152 may each comprise portions of the guide wire 148 comprising a core body of the guide wire 148. The core body of the intermediate portion 154 may have the plurality of cuts 156 (as well as cuts 164, 166) that reduce the stiffness of the intermediate portion 154 from a stiffness of the distal portion 150 and from a stiffness of the proximal portion 152. For example, FIG. 15 illustrates a partial cross section of a core body 168 of the intermediate portion including a plurality of cuts 156. The core body 168 includes a core wire having a central core 170 and a jacket 172 extending around the central core 170. The jacket 172 includes a plurality of cuts 156. The shape, size, number, and other configuration of the cuts 156 may be varied from the configuration shown in FIG. 15. In one embodiment, the jacket 172 may comprise a hypotube extending around the central core 170.

In other embodiments, other portions of the guide wire 148 may have cuts to reduce a stiffness of the intermediate portion 154 of the guide wire 148.

In one embodiment, an outer layer, such as an outer coil wire may extend over all or a portion of the guide wire 148. For example, an outer layer may extend over the intermediate portion 154 as desired.

The guide wires 116, 148 may include respective radiopaque markers 174, 176 or other markers that may be imaged. The markers 174, 176 may indicate the position of the respective intermediate portions 122, 154 such that a user, such as a surgeon or other medical professional, may identify whether a steerable portion of a delivery apparatus, such as the steerable portion 102 of the mitral valve delivery apparatus 92 shown in FIG. 7, is positioned over the intermediate portion 122, 154 of the guide wire 116, 148.

In other embodiments, the guide wires 116, 148 may have different configurations than shown in FIGS. 13 and 14.

Figure 16:
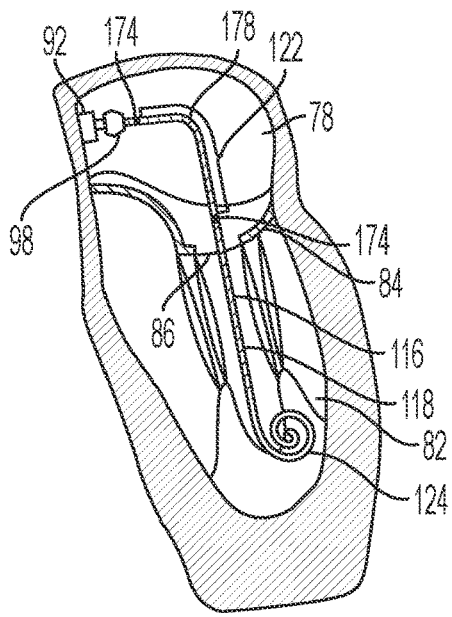
FIG. 16 illustrates a schematic view of a delivery apparatus and guide wire positioned in a portion of a patient's heart according to an embodiment of the present disclosure.
Figure 17:
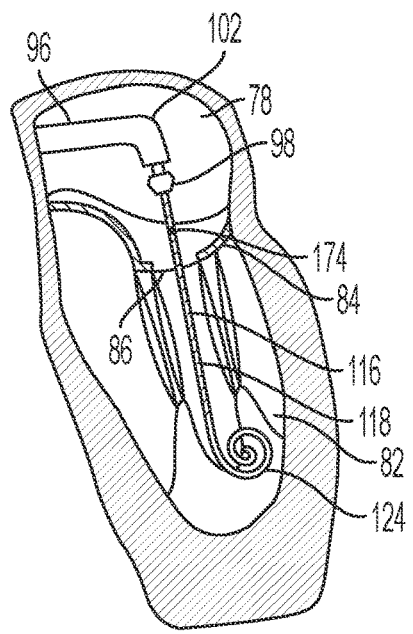
FIG. 17 illustrates a schematic view of a delivery apparatus and guide wire positioned in a portion of a patient's heart according to an embodiment of the present disclosure.

FIGS. 16 and 17 illustrate a method that may utilize the guide wires 116, 148 (although guide wire 116 is indicated in FIGS. 16 and 17, the same process may be utilized with guide wire 148). The guide wire 116, 148 may be passed into the left atrium 78 and the left ventricle 82 in a similar manner as discussed regarding the guide wires 10, 46 shown in FIGS. 1-4.

Referring to FIG. 16, the distal portion 118, 150 and the proximal portion 120, 152 having an increased stiffness from the stiffness of the intermediate portion 122, 154 may serve to enhance the stability of the respective guide wire 116, 148 as the guide wire 116, 148 is passed through the delivery catheter 80 (shown in FIG. 6) and into the left ventricle 82. The intermediate portion 122, 154, having a reduced stiffness, may serve to enhance the flexibility of the guide wire 116, 148 and the ability for the guide wire 116, 148 to bend at the bend 178 as shown in FIG. 16.

Upon the distal tip of the guide wire 116, 148 being positioned within the left ventricle 82, the user may image the radiopaque markers 174, 176 or other markers to assure that the intermediate portion 122, 154 remains in a position that the steerable portion 102 (marked in FIG. 17) of the mitral valve delivery apparatus 92 will extend over. The user may image a location of the intermediate portion 122, 154 within the left atrium to determine that a bend 178 occurs at the intermediate portion 122, 154 and that the steerable portion of the mitral valve delivery apparatus is positioned at the bend 178. For example, echocardiography or fluoroscopy, or another form of imaging may be utilized.

The mitral valve delivery apparatus 92 may be passed over the guide wire 116, 148 in a similar manner as discussed in regard to FIGS. 8 and 9. In FIG. 16, the mitral valve delivery apparatus is advanced along the guide wire 116, 148 and approaches the intermediate portion 122, 154. The mitral valve delivery apparatus 92 may be passed over the intermediate portion 122, 154 and the steerable portion 102 may be bent to form a configuration shown in FIG. 17. The mitral valve delivery apparatus 92 may be positioned over the intermediate portion 122, 154 of the guide wire 116, 148 while imaging the location of the intermediate portion 122, 154.

The intermediate portion 122, 154 having a reduced stiffness, may serve to enhance ability of the steerable portion to bend as shown in FIG. 17. The intermediate portion 122, 154 of the respective guide wire 116, 148 may be bent within the left atrium by bending the portion of the mitral valve delivery apparatus 92 that extends over the intermediate portion 122, 154. The distal portion 118, 150, having an increased stiffness from the intermediate portion, may serve to enhance the ability of the guide wire 116, 148 to guide and support the distal portion of the mitral valve delivery apparatus 92 and the prosthetic mitral valve within the left ventricle 82.

The prosthetic mitral valve 106 may be deployed in a similar manner as discussed in regard to FIGS. 10-12.

The guide wire 116, 148 may be withdrawn from the left ventricle 82 and left atrium 78 in a similar manner as discussed in regard to the guide wires 10, 46 shown in FIGS. 1-4.

The components and steps of the method shown in FIGS. 16-17 may be varied in other embodiments as desired.

In the methods disclosed in regard to FIGS. 5-12 and 16-17, the delivery catheter 80 may be shaped or otherwise configured to pass the respective guide wire from the catheter passing through the transseptal hole to the left ventricle 82. For example, the delivery catheter 80 may have a steerable end 88, as shown in FIG. 6 or may have an end that is shaped to deliver a guide wire at an angle towards the left ventricle 82.

Figure 18:
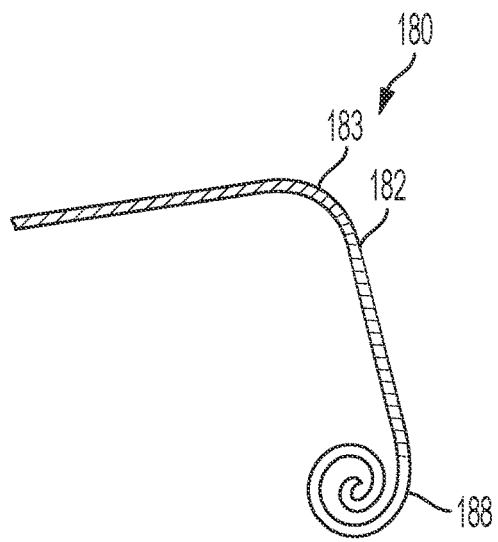
FIG. 18 illustrates a side view of a guide wire according to an embodiment of the present disclosure.

FIG. 18 illustrates an embodiment of a guide wire 180 having a portion 182 with a preformed shape that is configured such that the guide wire 180 deflects from the left atrium 78 into a left ventricle 82 of the patient's heart. The portion 182 may deflect in one radial dimension of the guide wire 180 or may deflect in two radial dimensions of the guide wire 180 (radial dimensions of a guide wire are marked in FIG. 27). The portion 182 may deflect in at least one radial dimension. The portion 182 may include a bend 183 at an angle of about ninety degrees as shown in FIG. 18. In other embodiments, other angles may be utilized depending on the geometry of the patient's heart and the position of the transseptal hole, among other factors. For example, a bend 183 at an angle of at least forty five degrees, or an angle of at least sixty degrees, may be utilized in other embodiments.

The portion 182 may be made of a shape memory material that assumes the preformed shape upon being passed out of a delivery catheter. The shape memory material may comprise a nitinol material or the like that is configured to automatically assume the preformed shape upon being passed out of the delivery catheter. In one embodiment, the portion 182 may be made out of a material such as stainless steel, which may retain a shape. In other embodiments, other materials may be utilized.

The shape of the portion 182 may be determined based on the geometry of the patient's heart and the position of the transseptal hole 76 in the atrial septum. For example, a user may determine the relative height 184 of the transseptal hole 76 in the atrial septum from the mitral annulus 86 and a transverse displacement 186 of the hole 76 (as marked in FIG. 19) and an angle of the mitral annulus 86 from the hole 76 and may set the preformed shape of the portion 182 based on those dimensions. Other methods may be utilized to determine a shape to be provided for the portion 182 of the guide wire 180.

The portion 182 may comprise a distal portion of the guide wire 180, proximate to the distal tip 188 of the guide wire.

In other embodiments, the guide wire 180 may have a different configuration than shown in FIG. 18.

Figure 19:
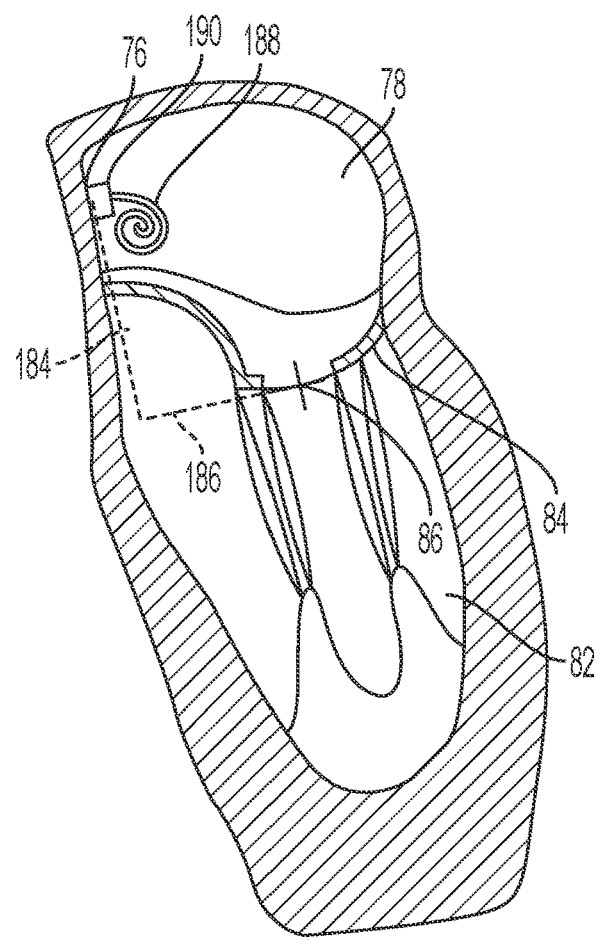
FIG. 19 illustrates a schematic view of a guide wire positioned in a portion of a patient's heart according to an embodiment of the present disclosure.
Figure 20:
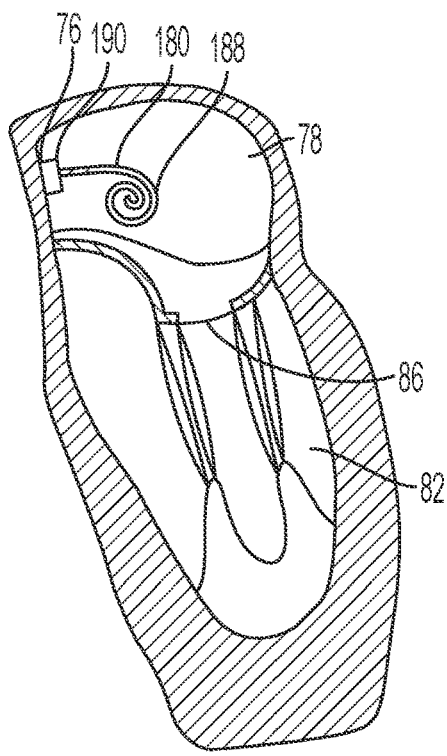
FIG. 20 illustrates a schematic view of a guide wire positioned in a portion of a patient's heart according to an embodiment of the present disclosure.
Figure 21:
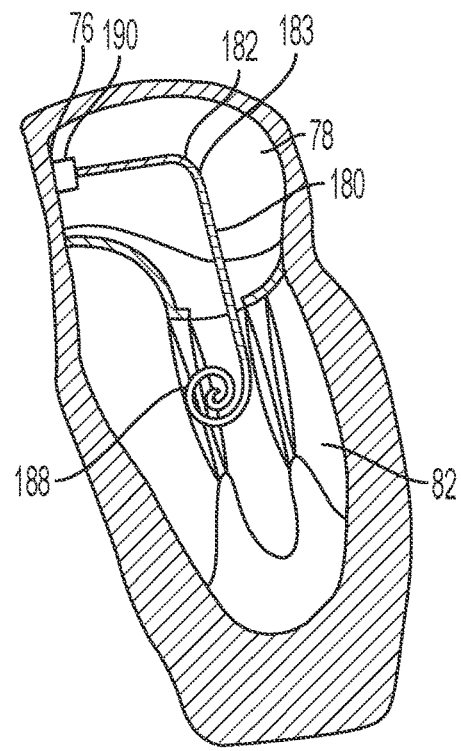
FIG. 21 illustrates a schematic view of a guide wire positioned in a portion of a patient's heart according to an embodiment of the present disclosure.

FIGS. 19-21 illustrate a method that may utilize the guide wire 180. A delivery catheter 190 may be advanced to the atrial septum in a similar manner as discussed in regard to FIG. 5. The delivery catheter 190, however, may not have a steerable end portion or angled opening. Rather, the delivery catheter 190 may extend close to the transseptal hole 76 in the atrial septum, whether in the left atrium 78 or the right atrium of the patient's heart. In other embodiments, the delivery catheter 190 may not be utilized.

A user may have set a preformed shape of the portion 182 of the guide wire 180 by determining a position of the transseptal hole 76. The preformed shape may be set based on the position of the transseptal hole 76 (e.g., height or transverse displacement as discussed previously). The preformed shape may be set based on imaging the location of the hole 76, or through another method of determining a position of the transseptal hole 76. In other embodiments, the preformed shape may be set without regard to the position of the transseptal hole 76. Other features of the patient's heart geometry may be utilized to set the preformed shape of the portion 182, as discussed previously (e.g., angle of the mitral annulus 86 from the hole 76).

The guide wire 180 may be passed into the left atrium of the patient's heart and out of the delivery catheter 190 with the distal tip 188 expanding as shown in FIG. 19. The distal tip 188 may be configured similarly as the distal tip 12 shown in FIG. 1. In one embodiment, the distal tip 188 may be made out of an echogenic or fluorogenic material to allow the tip 188 to be more easily imaged during insertion of the guide wire 180 into the left ventricle (e.g., with echocardiography or fluoroscopy, or another form of imaging).

Referring to FIG. 20, the guide wire 180 may begin to deflect from the transseptal hole 76 towards the mitral annulus 86.

The guide wire 180 may continue to be advanced through the delivery catheter 190 until the distal tip 188 reaches a desired position within the left ventricle 82, as shown in FIG. 21. The guide wire 180 extends from the transseptal hole 76 to the left ventricle 82. The preformed shape of the guide wire deflects from the transseptal hole 76 to the left ventricle 82.

The mitral valve delivery apparatus 92 may then pass along the guide wire 180 to deploy the prosthetic mitral valve 106 in a similar manner as discussed in FIGS. 10-12.

The guide wire 180 may be withdrawn from the left ventricle 82 and left atrium 78 in a similar manner as discussed in regard to the guide wires 10, 46 shown in FIGS. 1-4.

The components and steps of the method shown in FIGS. 19-21 may be varied in other embodiments as desired.

Figure 22:
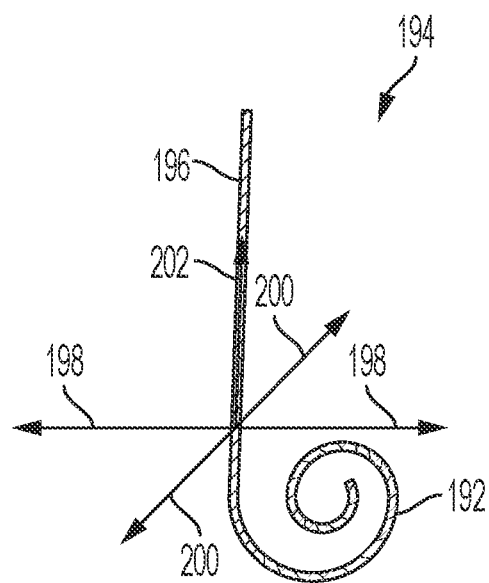
FIG. 22 illustrates a perspective view of a guide wire with dimensional axes shown according to an embodiment of the present disclosure.

FIG. 22 illustrates a side perspective view of a distal tip 192 of a guide wire 194 that may be utilized with embodiments of other guide wires disclosed herein. The distal tip 192 is coupled to an elongate wire 196, and is configured to expand radially outward from the elongate wire 196 in one radial dimension 198 of the elongate wire 196 (with the elongate wire having two radial dimensions 198, 200 extending perpendicular to each other, and an axial dimension 202 extending along the length of the elongate wire 196). The distal tip 192 forms a spiral shape (a pigtail shape) that extends within a vertical plane in the one radial dimension 198.

Figure 23:
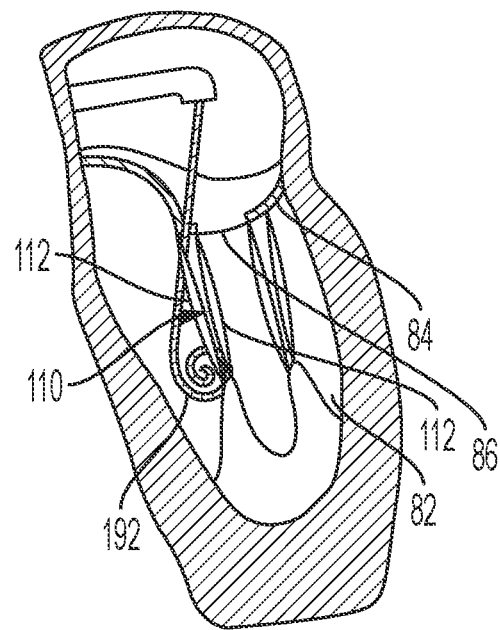
FIG. 23 illustrates a schematic view of a delivery catheter and guide wire positioned in a portion of a patient's heart according to an embodiment of the present disclosure.

Referring to FIG. 23, the distal tip 192 is passed through the mitral annulus 86 and into the left ventricle 82 via methods disclosed herein. If, however, the insertion angle of the distal tip 192 into the left ventricle 82 is incorrect, then the distal tip 192, with its single plane shape, may pass through or "stitch" adjacent chordae tendineae 112. This is because openings 110 are present between adjacent chordae tendineae 112 that have a generally elongate shape in a vertical plane. The corresponding shape of the distal tip 192 in the single radial dimension 198 may allow the distal tip 192 to pass through the chordae tendineae 112, which may be undesirable. FIG. 23, for example, illustrates the distal tip 192 passing through an opening 110 between adjacent chordae tendineae 112.

Figure 24:
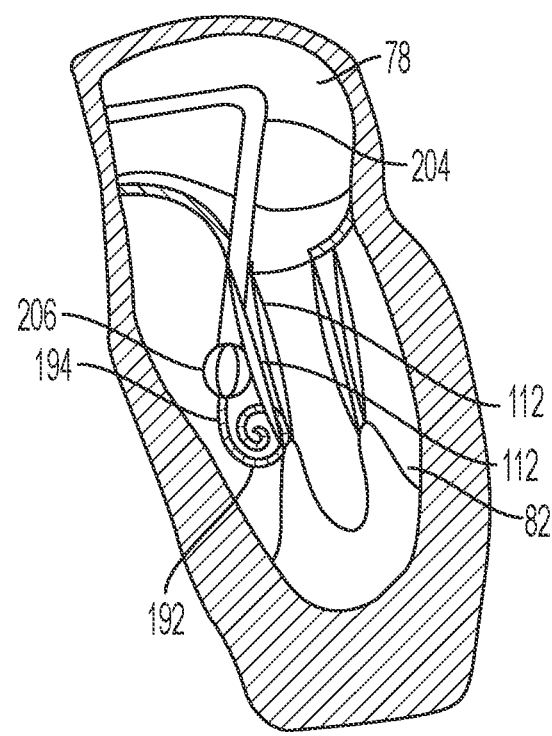
FIG. 24 illustrates a schematic view of a balloon catheter and guide wire positioned in a portion of a patient's heart according to an embodiment of the present disclosure.

A procedure to check if the distal tip 192 passes between adjacent chordae tendineae 112 is shown in FIG. 24, in which a separate balloon catheter 204 may be passed over the guidewire 194, with a balloon 206 inflated proximal the distal tip 192, and then withdrawn to see if any interference with chordae tendineae 112 is present. Alternatively, the balloon 206 may be inflated within the left atrium 78 and then advanced forward along the guide wire 194 to see if any interference with chordae tendineae 112 is present. If interference is detected, via imaging or the like, then the guide wire 194 would need to be withdrawn and reinserted into the left ventricle 82 until the guide wire 194 is placed in the desired location. Such an operation may increase the number of steps involved in a mitral valve implantation procedure, which may be undesirable.

Figure 25:
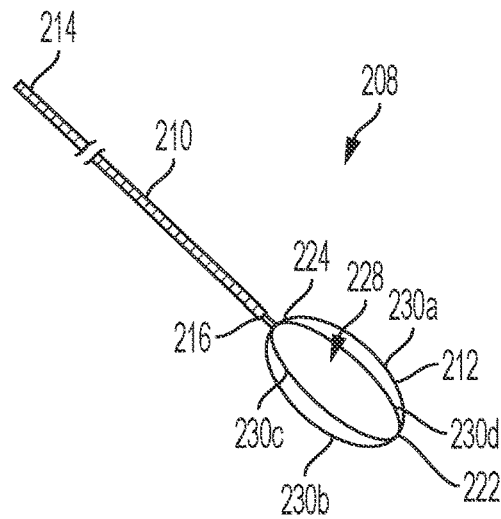
FIG. 25 illustrates a perspective view of a guide wire according to an embodiment of the present disclosure.

FIG. 25 illustrates a perspective view of a guide wire 208 according to an embodiment of the present disclosure. The guide wire 208 may include an elongate wire 210 and a distal tip 212 coupled to the elongate wire 210. The elongate wire 210 may include a proximal end 214 and a distal end 216, with a length therebetween, and with the distal tip 212 coupled to the distal end 216 of the elongate wire 210.

The distal tip 212 may be configured to move from an undeployed configuration to a deployed configuration in which the distal tip 212 expands radially outward from the elongate wire 210 in two radial dimensions 198, 200 (marked in FIG. 27) of the elongate wire 210.

Figure 26:
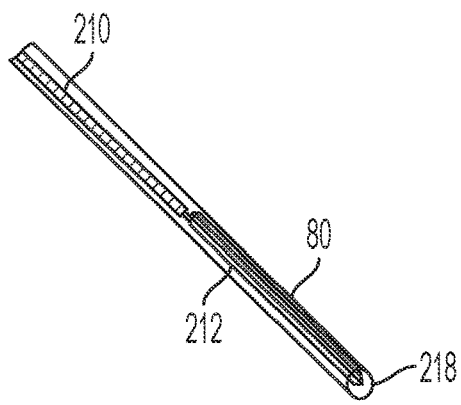
FIG. 26 illustrates a schematic perspective view of a guide wire within a lumen of a delivery catheter according to an embodiment of the present disclosure.

FIG. 26 illustrates a perspective view of the distal tip 212 in an undeployed, or unexpanded configuration. The distal tip 212 in the undeployed, or unexpanded configuration may have a lesser thickness in the two radial dimensions 198, 200 of the elongate wire 210 than the thickness of the distal tip 212 in the deployed, or expanded configuration. The distal tip as shown in FIG. 26 may be in a linearized or straightened configuration in which the distal tip may fit within a lumen 218 of a delivery catheter 80 for delivering the guide wire 208 to a desired location.

The distal tip 212 may be preformed into the deployed configuration. For example, the distal tip 212 may be made of a shape memory material such as nitinol or another shape memory material, or may otherwise be preformed into the deployed configuration (e.g., the distal tip may be made of a stainless steel material or the like that may move towards a preformed shape). The distal tip 212 may be configured to automatically move from the undeployed configuration to the deployed configuration upon being passed out of the lumen 218 of the delivery catheter 80.

Figure 27:
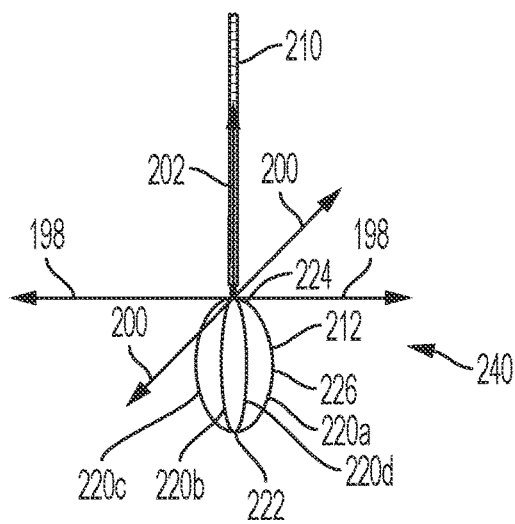
FIG. 27 illustrates a perspective view of a guide wire with dimensional axes shown according to an embodiment of the present disclosure.

FIGS. 25 and 27 illustrate the distal tip 212 in the deployed, or expanded configuration. The distal tip 212 expands radially outward from the elongate wire 210 in the two radial dimensions 198, 200 of the elongate wire 210. The radial dimensions 198, 200 are indicated in FIG. 27. Two radial dimensions 198, 200 extend perpendicular to each other, and the axial dimension 202 extends along the length of the elongate wire 210. Thus, unlike the embodiment shown in FIG. 22, the expansion of the distal tip 212 in the two radial dimensions 198, 200 may reduce the possibility of passing through openings 110 between adjacent chordae tendineae 112.

Referring to FIG. 27, the distal tip 212 in the deployed configuration forms a shape expanding radially outward from the elongate wire 210 in the two radial dimensions 198, 200. The shape is a three-dimensional shape that also extends in the axial dimension 202 of the elongate wire 210 in addition to the two radial dimensions 198, 200. The shape as shown in FIG. 27 is an ovoid shape, with four lobes 220a-d, although in other embodiments other shapes or numbers of lobes may be utilized as desired.

The distal tip 212 in the deployed configuration may have a distal portion 222 and a proximal portion 224. The distal tip 212 may increase in size from the distal portion 222 towards the proximal portion 224. The distal tip 212 may increase in size to a middle portion 226 of the distal tip 212 and then may decrease in size from the middle portion 226 to the proximal portion 224.

The distal tip 212 may have a convex curvature from the distal portion 222 towards the proximal portion 224. The convex curvature may continue until the middle portion 226 of the distal tip 212. The distal tip 212 may also have a convex curvature from the proximal portion 224 towards the distal portion 222, which may continue until the middle portion 226 of the distal tip 212.

The distal tip 212 in the deployed configuration may form a body that bounds a volume 228 (marked in FIG. 25). The distal tip may include one or more arms 230a-d (four arms as shown in FIG. 25) that are shaped into the body. The arms 230a-d may join to each other at the distal portion 222 of the distal tip 212 and at the proximal portion 224 of the distal tip 212. The arms 230a-d may bow outward from the interior volume 228 of the distal tip 212. The body may have a curved outer surface that may be configured to be atraumatic to heart tissue.

Figure 28:
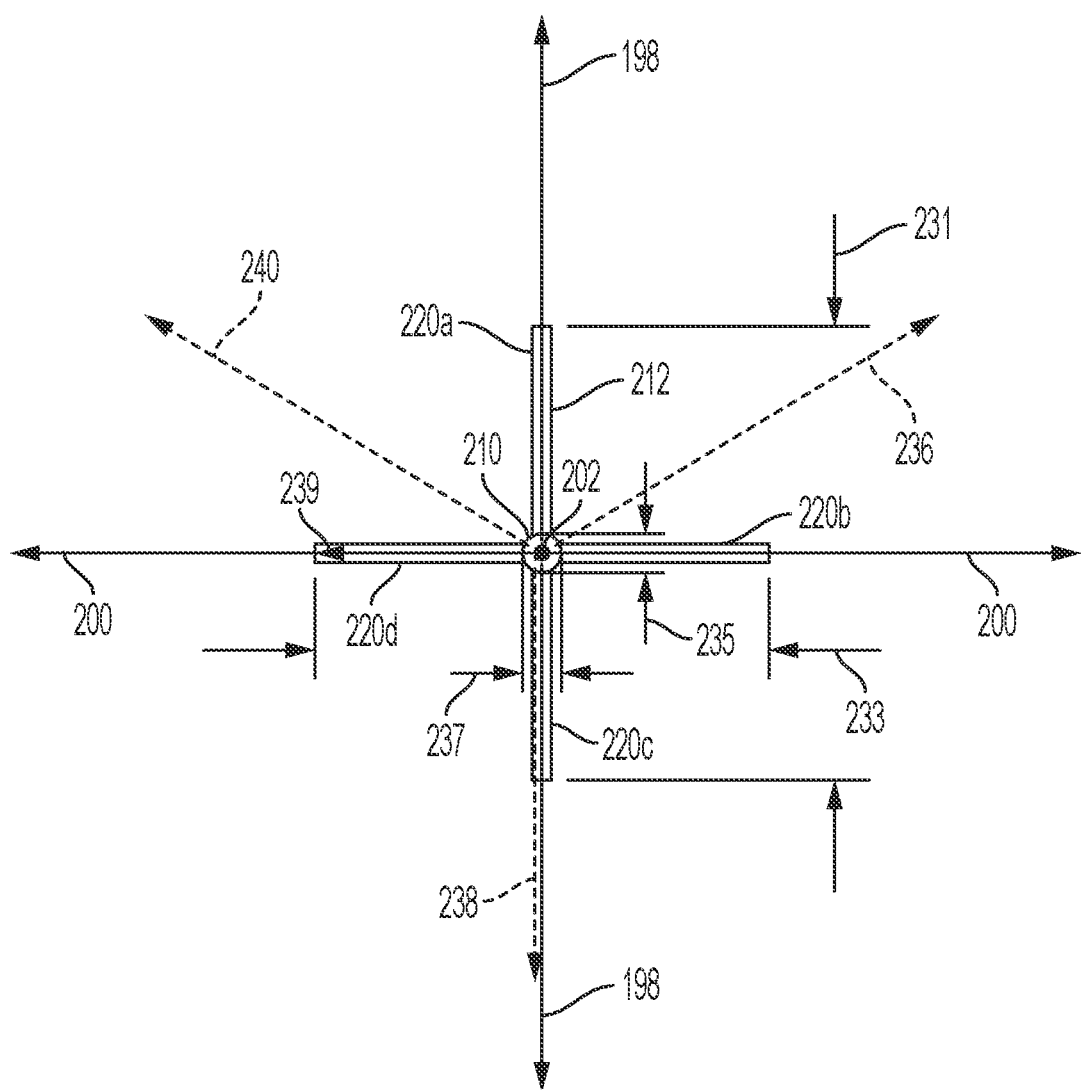
FIG. 28 illustrates an axial view of the guide wire shown in FIG. 25 with dimensional axes shown according to an embodiment of the present disclosure.

FIG. 28 illustrates an axial view of the distal tip 212 in the deployed configuration. The distal tip 212 extends outward from the axial dimension 202. The distal tip 212 has a respective thickness 231, 233 in each of the two radial dimensions 198, 200 of the elongate wire 210 that is greater than the respective thickness 235, 237 of the elongate wire 210 in the two radial dimensions 198, 200. The distal tip 212 in the deployed configuration may be configured to have a radius 239 and thickness 231, 233 that approximates a radius and thickness that may be provided by the clearance balloon 206 shown in FIG. 24. For example, the distal tip 212 may be configured to have a radius 239 of at least one centimeter. The distal tip may be configured to have a thickness 231, 233 in each of the two radial dimensions 198, 200 of the elongate wire 210 that is at least two centimeters. Other radiuses and thicknesses may be utilized as desired.

The shape and construction of the distal tip 212 in the deployed configuration may be configured to be atraumatic to heart tissue. For example, the distal tip 212 may be configured to be flexible such that heart tissue is not damaged upon contact with the distal tip 212. The distal tip 212 may be configured with a shape so as to not puncture a ventricular apex of the patient's heart upon insertion into a ventricle of the patient's heart.

The distal tip 212 in the deployed configuration may be configured to deflect the elongate wire 210 upon contacting an external surface. For example, the elongate wire 210 may be flexible such that as the distal tip 212 contacts an external surface (such as heart tissue), the distal tip 212 deflects the elongate wire 210 away from the contacted surface. In addition, the elongate wire 210 may have a tapered stiffness, that tapers downward in stiffness towards the distal tip 212. As such, the distal tip 212 may allow the elongate wire 210 to deflect and avoid passing through the external surface. Further, FIG. 28 illustrates that at least a portion of the distal tip 212 in the deployed configuration is positioned within each third of radial space (marked between dashed lines 236, 238, 240) that extends outward from the axial dimension 202, such that an external surface may move the distal tip 212 in three radial directions. The distal tip 212 in the deployed configuration may extend symmetrically outward from the axial dimension 202 in the two radial dimensions of the elongate wire 210.

Figure 29:
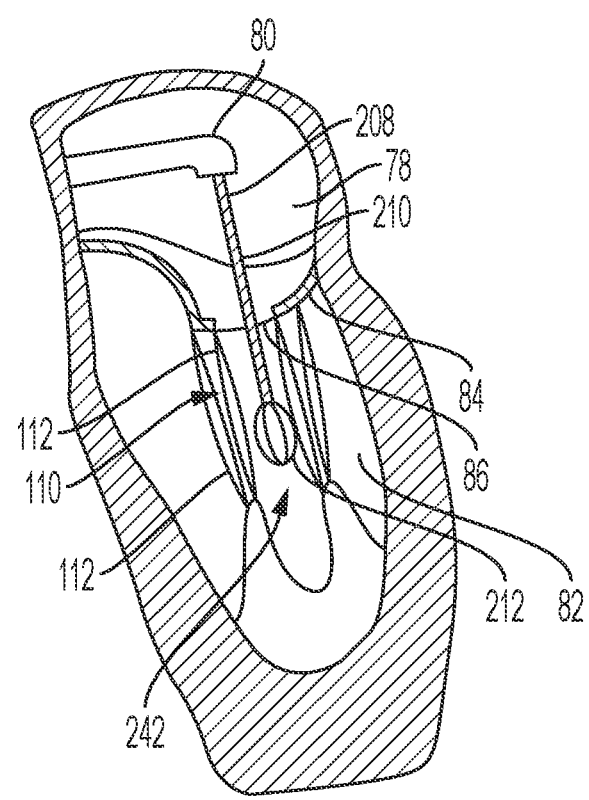
FIG. 29 illustrates a schematic view of a delivery catheter and guide wire positioned in a portion of a patient's heart according to an embodiment of the present disclosure.

FIG. 29 illustrates a method that may utilize the guide wire 208. A delivery catheter 80 may be advanced to the atrial septum in a similar manner as discussed in regard to FIG. 5. The guide wire 208 may be passed through the atrium septum and into the left atrium. The guide wire 208 may be passed out of the delivery catheter 80 with the distal tip 212 expanding in the two radial dimensions 198, 200 of the elongate wire 210 as marked in FIG. 27.

The distal tip 212 in the deployed configuration may be passed through a portion of a left ventricle of the patient's heart by being passed through the mitral valve annulus 86. This leading portion of the guide wire 208 may contact the chordae tendineae 112, yet the expansion of the distal tip 212 in the two radial dimensions may reduce the possibility of the distal tip 212 passing between the chordae 112, unlike the embodiment shown in FIG. 23. The distal tip 212 may have a thickness in the two radial dimensions that is greater than a size of an opening 110 between adjacent chordae tendineae 112 of the left ventricle 82, and accordingly may not pass between the adjacent chordae tendineae 112.

If the distal tip 212 does contact chordae tendineae 112, then the elongate wire 210 may be deflected by the distal tip 212 contacting against the chordae tendineae 112 and deflecting the elongate wire 210 away from the chordae tendineae 112. The distal tip 212 and elongate wire 210 may be deflected through a central passage 242 between the chordae tendineae 112. As such, the distal tip 212 may serve to automatically deflect and center the elongate wire 210 as the guide wire 208 passes through the mitral annulus 86. A balloon check (as shown in FIG. 24) may not be required to confirm whether the guide wire 208 passes between adjacent chordae tendineae 112, thus reducing the steps of the mitral valve implantation procedure.

The mitral valve delivery apparatus 92 (as marked in FIG. 7) may then pass along the guide wire 208 to deploy the prosthetic mitral valve 106 in a similar manner as discussed in FIGS. 10-12.

The guide wire 208 may be withdrawn from the left ventricle 82 and left atrium 78 in a similar manner as the guide wires 10, 46 shown in FIGS. 1-4. The distal tip 212 may be compressed and returned to the undeployed or unexpanded configuration within a catheter in order to be extracted through the transseptal hole. The distal tip 212 may be pulled through the lumen of a catheter to be compressed and returned to the undeployed or unexpanded configuration.

FIGS. 30-41 illustrate embodiments of shapes of distal tips 244, 246, 248, 250, 252, 254 in deployed configurations that may be utilized with the elongate wire 210. Each embodiment comprises a distal tip coupled to the elongate wire 210 and configured to move from an undeployed configuration to a deployed configuration in which the distal tip 244, 246, 248, 250, 252, 254 expands radially outward from the elongate wire 210 in two radial dimensions 198, 200 (radial dimensions marked in FIG. 27) of the elongate wire 210. Each distal tip may be preformed into the deployed configuration and is configured to automatically move from the undeployed configuration. For example, similar to the embodiment shown in FIGS. 25-29, each distal tip 244, 246, 248, 250, 252, 254 may be made of a shape memory material or may otherwise be preformed into the deployed configuration.

Each distal tip 244, 246, 248, 250, 252, 254 in the deployed configuration has a thickness in two radial dimensions of the elongate wire 210 that is greater than a thickness of the elongate wire 210 in the two radial dimensions. For example, each distal tip may have a radius of at least one centimeter.

Each distal tip 244, 246, 248, 250, 252, 254 may be configured to be in an undeployed, or unexpanded configuration configured to fit within a catheter lumen 218, as shown in FIG. 26. Each distal tip may be configured to be atraumatic to heart tissue and configured to deflect the elongate wire 210 away from an external surface, similar to the embodiment shown in FIGS. 25-29. Each distal tip may have at least a portion of the distal tip in the deployed configuration positioned within each third of radial space (marked between lines 236, 238, 240 in FIG. 28) extending outward from the axial dimension 202, such that an external surface may move the distal tip in three radial directions.

Each distal tip 244, 246, 248, 250, 252, 254 may operate in a similar manner as the embodiment shown in FIGS. 25-29.

Figure 30:
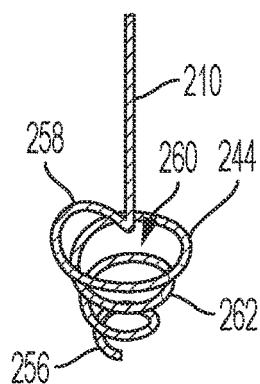
FIG. 30 illustrates a perspective view of a guide wire according to an embodiment of the present disclosure.

FIG. 30 illustrates an embodiment in which the distal tip 244 in the deployed configuration forms a three-dimensional shape (a shape extending along the axial dimension 202 in addition to the two radial dimensions 198, 200). The shape is a conical spiral shape.

The distal tip 244 in the deployed configuration may have a distal portion 256 and a proximal portion 258. The distal tip 244 may increase in size from the distal portion 256 towards the proximal portion 258. The distal tip 244 may have a convex curvature from the distal portion 256 towards the proximal portion 258.

The distal tip 244 in the deployed configuration may form a body that bounds a volume 260. The distal tip includes one or more arms (one arm 262 is shown in FIG. 30) that forms the spiral body. The arm 262 couples to the elongate wire at the proximal portion 258 of the distal tip 244 and terminates at the distal portion 256 of the distal tip 244. The body may have a curved outer surface that may be configured to be atraumatic to heart tissue.

Figure 31:
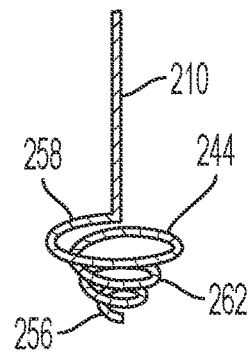
FIG. 31 illustrates a side view of the guide wire shown in FIG. 30.

FIG. 31 illustrates a side view of the distal tip 244.

Figure 32:
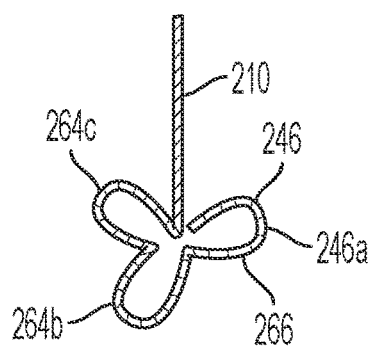
FIG. 32 illustrates a perspective view of a guide wire according to an embodiment of the present disclosure.

FIG. 32 illustrates an embodiment in which the distal tip 246 in the deployed configuration forms a flat lobed shape (a flat clover shape). As shown, the body may include three outwardly extending lobes 264a, 264b, 264c, although a different number of lobes may be utilized as desired. The shape may include one or more arms (one arm 266 is shown in FIG. 32) shaped into the body, and may have a curved outer surface.

Figure 33:
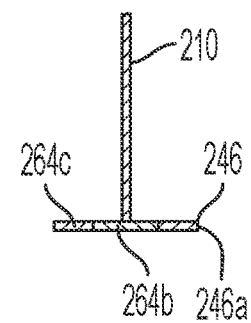
FIG. 33 illustrates a side view of the guide wire shown in FIG. 32.

FIG. 33 illustrates a side view of the distal tip 246.

Figure 34:
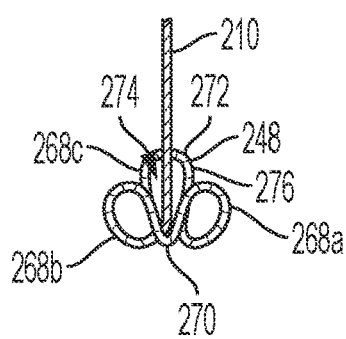
FIG. 34 illustrates a perspective view of a guide wire according to an embodiment of the present disclosure.

FIG. 34 illustrates an embodiment in which the distal tip 248 in the deployed configuration forms a three-dimensional shape (a shape extending along the axial dimension 202 in addition to the two radial dimensions 198, 200). The shape comprises the lobes 264a-c shown in FIG. 32 deflected rearward to form a conical lobed shape. As shown, the body may include three outwardly extending lobes 268a-c, although a different number of lobes may be utilized as desired.

The distal tip 248 in the deployed configuration may have a distal portion 270 and a proximal portion 272. The distal tip 248 may increase in size from the distal portion 270 towards the proximal portion 272. The distal tip 248 may have a convex curvature from the distal portion 270 towards the proximal portion 272.

The distal tip 248 in the deployed configuration may form a body that bounds a volume 274. The distal tip 248 may include one or more arms (one arm 276 is shown in FIG. 34) that forms the conical lobed body. The body may have a curved outer surface that may be configured to be atraumatic to heart tissue.

Figure 35:
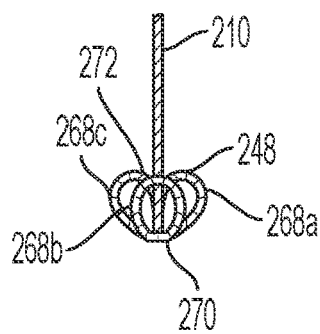
FIG. 35 illustrates a side view of the guide wire shown in FIG. 34.

FIG. 35 illustrates a side view of the distal tip 248.

Figure 36:
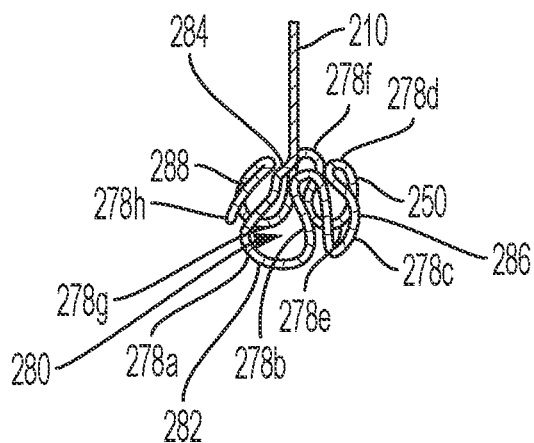
FIG. 36 illustrates a perspective view of a guide wire according to an embodiment of the present disclosure.

FIG. 36 illustrates an embodiment in which the distal tip 250 in the deployed configuration forms a three-dimensional shape (a shape extending along the axial dimension 202 in addition to the two radial dimensions 198, 200). The shape is a lobed spherical shape. The lobed spherical shape may be formed by alternating upward and downward orientated lobes 278a-h that bound a volume 280. As shown, the body may include eight lobes 278a-h, although a different number of lobes may be utilized as desired.

The distal tip 250 in the deployed configuration may have a distal portion 282 and a proximal portion 284. The distal tip 250 may increase in size from the distal portion 282 towards the proximal portion 284. The distal tip 250 may increase in size until a middle portion 286 of the distal tip 250 and then may decrease in size from the middle portion 286 to the proximal portion 284.

The distal tip 250 may have a convex curvature from the distal portion 282 towards the proximal portion 284. The convex curvature may continue until a middle portion 286 of the distal tip. The distal tip 250 may have a convex curvature from the proximal portion 284 towards the distal portion 282, which may continue until a middle portion 286 of the distal tip 250.

The distal tip 250 may include one or more arms (one arm 288 is shown in FIG. 36) that are shaped into the body. The arm 288 may join to the elongate wire 210 at the proximal portion 284 of the distal tip. The arm 288 may form the lobed shaped. The body may have a curved outer surface that may be configured to be atraumatic to heart tissue.

Figure 37:
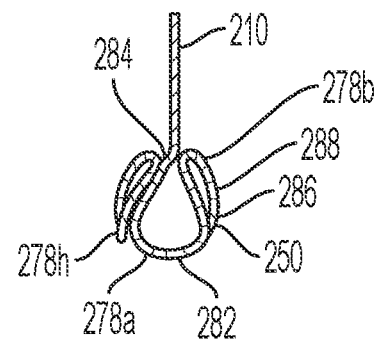
FIG. 37 illustrates a side view of the guide wire shown in FIG. 36.

FIG. 37 illustrates a side view of the distal tip 250.

Figure 38:
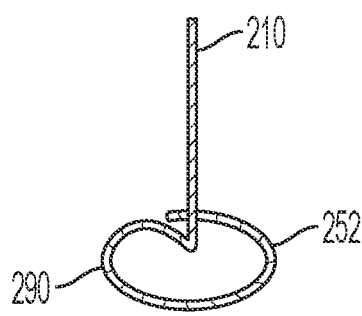
FIG. 38 illustrates a perspective view of a guide wire according to an embodiment of the present disclosure.

FIG. 38 illustrates an embodiment in which the distal tip 252 in the deployed configuration forms a flat circular shape (a flat ring shape). The shape may include one or more arms (one arm 290 is shown in FIG. 38) shaped into the body, and may have a curved outer surface.

Figure 39:
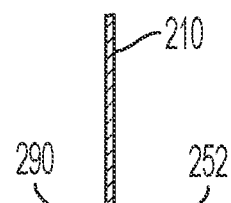
FIG. 39 illustrates a side view of the guide wire shown in FIG. 38.

FIG. 39 illustrates a side view of the distal tip 252.

Figure 40:
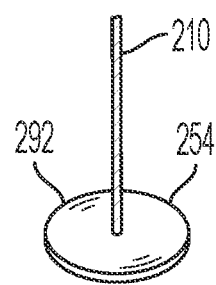
FIG. 40 illustrates a perspective view of a guide wire according to an embodiment of the present disclosure.

FIG. 40 illustrates an embodiment in which the distal tip 254 in the deployed configuration forms a flat circular shape (a flat disk shape). The shape may include a disk body 292 that extends radially outward from the elongate wire 210. The shape has a curved outer surface.

Figure 41:
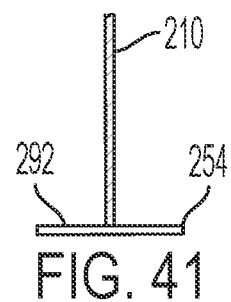
FIG. 41 illustrates a side view of the guide wire shown in FIG. 40.

FIG. 41 illustrates a side view of the distal tip 254.

The embodiments of distal tips 212, 244, 246, 248, 250, 252, 254 may be integral with the elongate wire 210. For example, the embodiments of distal tips may be an extension of the core body, an outer layer, a combination thereof, or may comprise another portion of the elongate wire. The distal tips 212, 244, 246, 248, 250, 252, 254 may be made of the material of the core body, which may include a nitinol core wire or other material of core wire. In one embodiment, the distal tips 212, 244, 246, 248, 250, 252, 254 may be made of a nitinol core wire wrapped in a nitinol coil. In other embodiments, other materials may be utilized, which may include stainless steel among others.

The distal tips may have one or more of a spiral, conical, lobed, spherical, ovoid, circular, or flat shape, or other shapes as desired. The configuration of the distal tips may be varied in other embodiments as desired.

Figure 42:
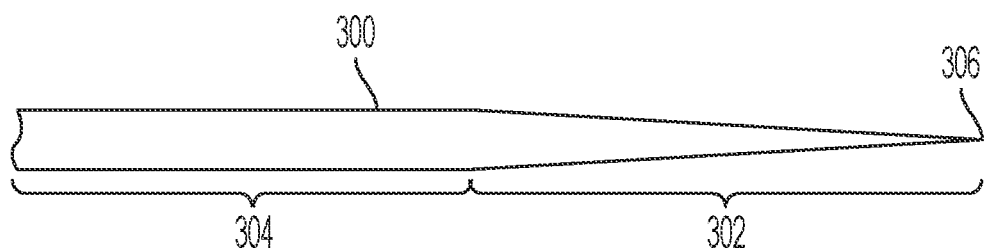
FIG. 42 illustrates a cross sectional view of a proximal portion of a guide wire according to an embodiment of the present disclosure.

FIG. 42 illustrates a cross sectional view of a proximal portion of a guide wire 300. The proximal portion may include a proximal tip portion 302 that may be adjacent to an adjacent portion 304 of the guide wire 300 distal of the proximal tip portion 302. The guide wire 300 may have a distal tip portion at the opposite end of the guide wire 300 that may be configured for insertion into a portion of a patient's body. The distal tip portion may be configured to include any of the distal tips disclosed herein or any other form of distal tip.

The proximal tip portion 302 may have a stiffness that is reduced from a stiffness of the adjacent portion 304 of the guide wire 300 distal of the proximal tip portion 302. The proximal tip portion 302 may have its stiffness reduced by having a diameter that is reduced from a diameter of the adjacent portion 304. As shown in FIG. 42, for example, a diameter of the outer surface of the proximal tip portion 302 may be less than the diameter of the outer surface of the adjacent portion 304. Further, as shown in FIG. 42, at least a portion of the proximal tip portion 302 tapers downward in a proximal direction. The outer surface of the proximal tip portion 302 may taper downward from the adjacent portion 304 to a proximal end 306 of the proximal tip portion 302. The tapered profile may allow the proximal tip portion 302 to increasingly reduce in stiffness (and increase in flexibility) in the direction towards the proximal end 306 of the guide wire 300. The guide wire 300, or at least the proximal tip portion 302 shown in FIG. 42 may comprise a unitary body. The unitary body may couple to a core body (or core wire) of the distal tip portion, or other portion of the distal tip portion if desired.

Figure 43:
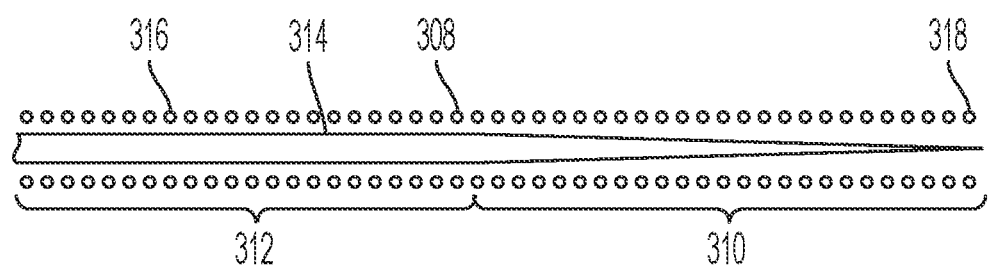
FIG. 43 illustrates a cross sectional view of a proximal portion of a guide wire according to an embodiment of the present disclosure.

FIG. 43 illustrates a proximal portion of a guide wire 308 that, similar to the guide wire 300, includes a proximal tip portion 310 having a stiffness that is reduced from a stiffness of the adjacent portion 312 of the guide wire 308 distal of the proximal tip portion 302. The guide wire 308 may have a distal tip portion at the opposite end of the guide wire 308 that may be configured for insertion into a portion of a patient's body. The distal tip portion may be configured to include any of the distal tips disclosed herein or any other form of distal tip.

The proximal tip portion 310 may have its stiffness reduced by having a diameter that is reduced from a diameter of the adjacent portion 312. As shown in FIG. 43, for example, a diameter of a core body 314 (which may comprise a core wire) of the proximal tip portion 310 may be less than the diameter of the core body 314 of the adjacent portion 312. An outer layer 316 may extend around the core body 314 and may comprise an outer coil or another form of outer layer. Further, as shown in FIG. 43, at least a portion of the proximal tip portion 310 tapers downward in a proximal direction. The outer surface of the core body 314 of the proximal tip portion 302 may taper downward from the core body 314 of the adjacent portion 304 to a proximal end 318 of the proximal tip portion 302. The diameter and profile of the outer layer 316 may remain constant from the adjacent portion 312 to the proximal tip. However, the tapered profile of the core body 314 may allow the proximal tip portion 310 to increasingly reduce in stiffness (and increase flexibility) in the direction towards the proximal end 318 of the guide wire 308. portion 310.

The core body 314 of the guide wire 308 may couple to a core body (or core wire) of the distal tip portion, or other portion of the distal tip portion if desired.

The lengths of the proximal tip portions 302, 310, and the adjacent portions 304, 312 may be varied as desired. The length from the proximal ends 306, 318 of the guide wires to the distal ends of the distal tip portions may be at least 100 centimeters, or at least 200 centimeters, or may be about or at least 300 centimeters in embodiments. Other dimensions may be utilized as desired.

Figure 44:
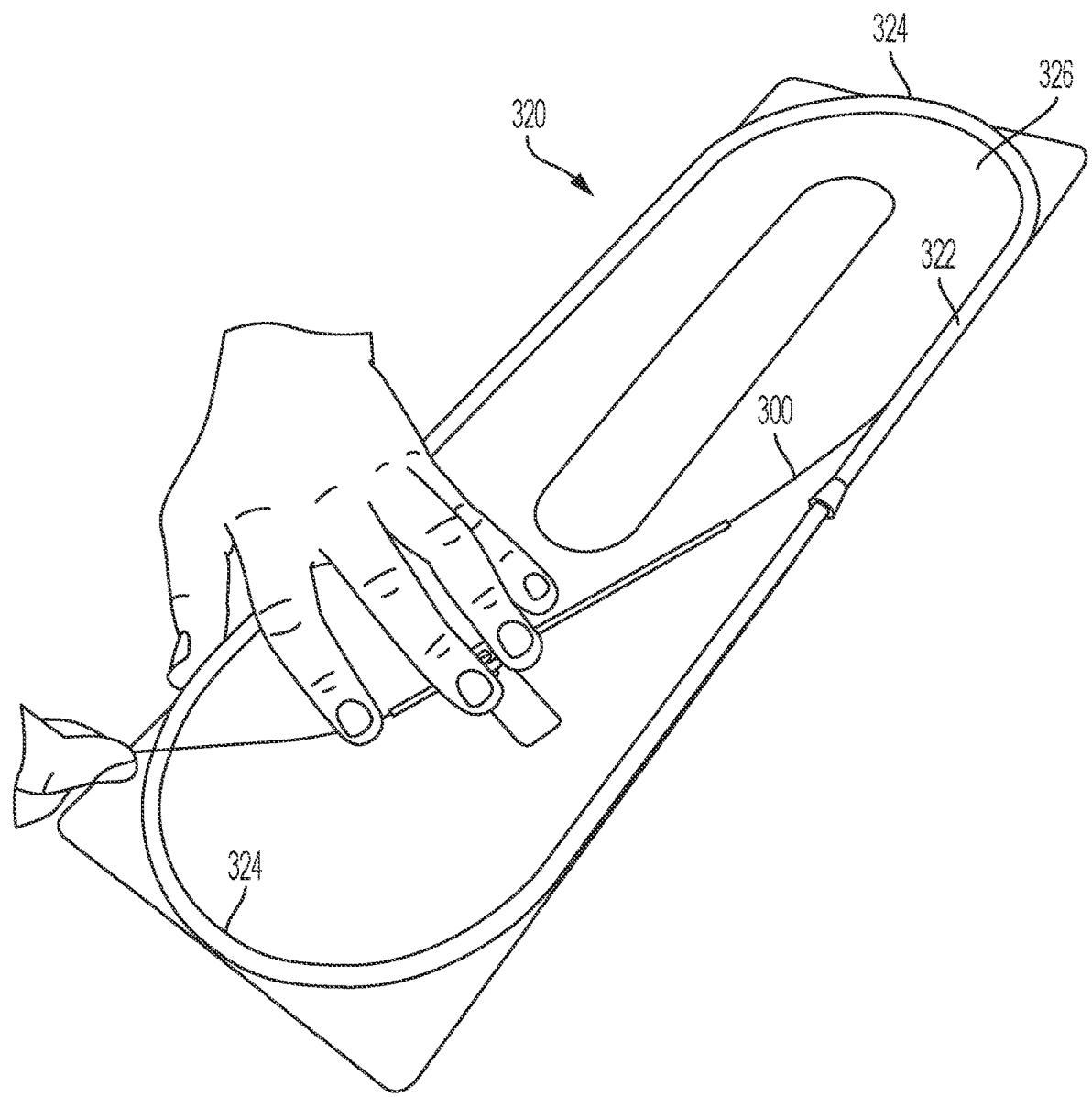
FIG. 44 illustrates a perspective view of a retainer for a guide wire.

In both the embodiments of FIGS. 42 and 43, the reduced stiffness and increased flexibility of the proximal tip portions may provide a benefit in the retention of the guide wires 300, 308 prior to use of the guide wires 300, 308. FIG. 44, for example, illustrates a retainer 320 that may be configured to store either of the guide wires 300, 308. The retainer 320 may comprise packaging that is utilized to retain either of the guide wires 300, 308 and may be the packaging that the guide wire 300, 308 is held in when the guide wire 300, 308 is not being used. The retainer 320 may include a body 322 that defines a channel for the guide wire 300, 308 to be positioned in and held in when the guide wire 300, 308 is not being used. The body 322 for example, may comprise a tube, or a series of eyelets, or another body defining a channel. The body 322 may be configured such that the channel includes one or more bends 324 and the body 322 thus forms a loop, as shown in FIG. 44. The body 322 may have an oblong or oval shape as shown in FIG. 44, or a circular shape, or may have another shape as desired. The body 322 may be positioned on a connecting surface, which may be in the form of a backing 326 as shown in FIG. 44 or other form of connecting surface that may hold the body 322 in position.

Figure 45:
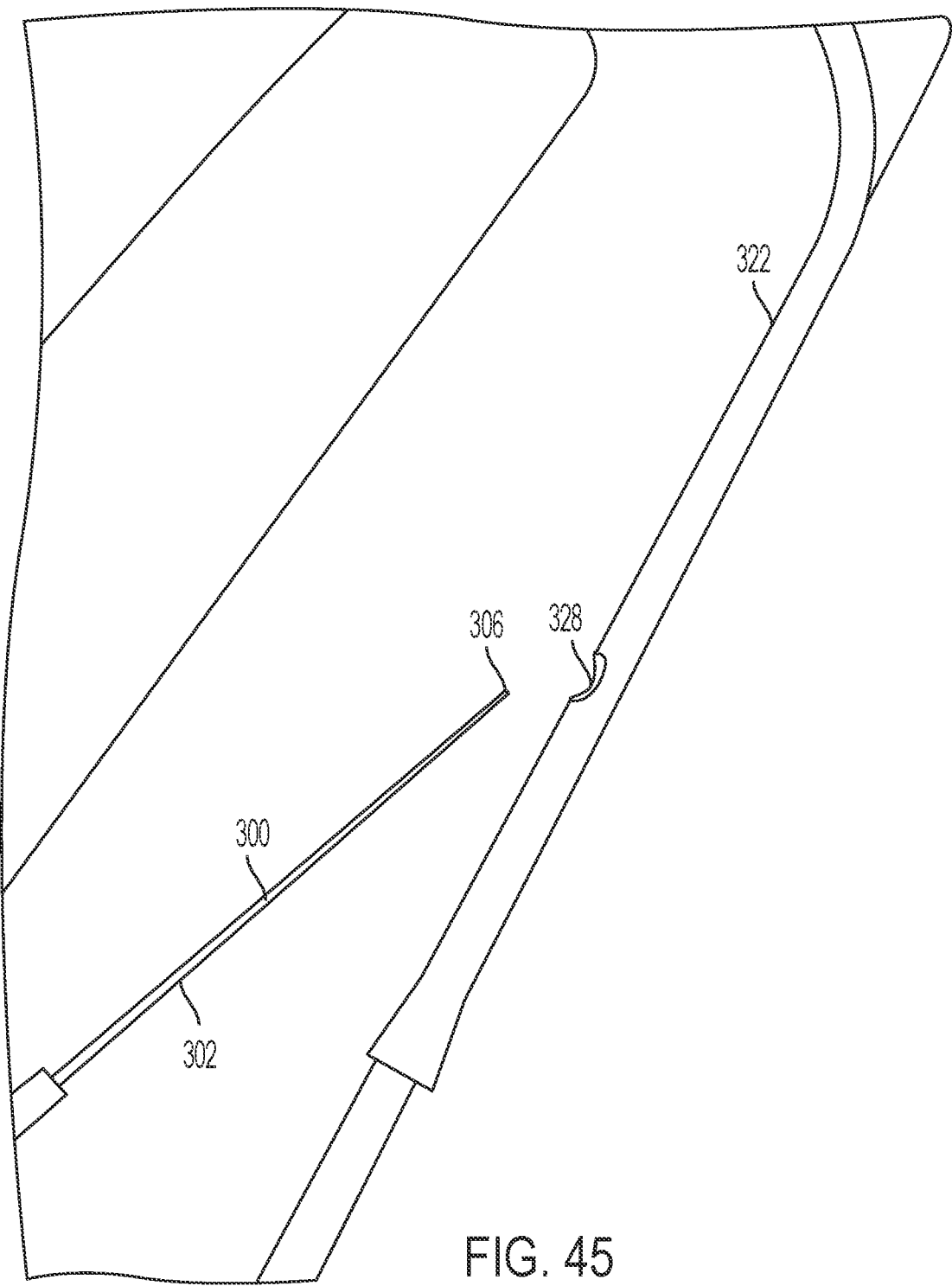
FIG. 45 illustrates a close-up perspective view of a guide wire being inserted into a retainer.

The guide wires 300, 308, when being packaged or otherwise when being retained by the retainer 320 may be inserted into the body 322. FIG. 45, for example, illustrates the body 322 may include an opening 328 for the guide wires 300, 308 to be passed through to be positioned within the channel of the body 322. The opening 328 may be configured for the proximal tip portions of the guide wires 300, 308 to be inserted into, to allow for entry of the channel. The guide wires are inserted into the opening 328 with the proximal ends of the guide wires leading, such that if the proximal tip portions are too stiff, then the guide wire may not properly bend into the body 322 and may either puncture the body 322, bounce back out of the opening 328 due to failure to bend into the channel of the body 322, or otherwise fail to properly insert into the channel of the body 322. As such, the enhanced flexibility of the proximal tip portions of the guide wires 300, 308 may improve the insertion of the guide wires 300, 308 into the retainer 320.

As shown in FIGS. 44 and 45, the proximal tip portions of the guide wires 300, 308 may thus be configured to deflect upon insertion into the opening 328 to bend into the channel. The deflection may be allowed due to the improved flexibility of the proximal tip portions. The guide wire 300, 308 may then be slid within the channel of the body 322 with the proximal tip portions deflecting within the channel. The guide wire 300, 308 may continue to be slid to form multiple loops of the guide wires 300, 308 within the body 322 of the retainer 320, such that the retainer may store a length of the guide wire (which may be longer than the circumference of the body 322). The flexibility of the proximal tip portions of the guide wires 300, 308 may allow for loading into a retainer in more compact form factors and with tighter bend radii than a stiffer proximal tip portion. As such, a variety of form factors of the retainer (including smaller bend radii and smaller overall form factors) may be utilized with the guide wires 300, 308.

The guide wires 300, 308 may remain stored by the retainer 320 until a time for use of the guide wires 300, 308, which may include withdrawing the guide wires 300, 308 from the opening 328 and from the channel of the body 322.

The guide wires 300, 308 may be inserted into the retainer 320 as part of a packaging process, and the guide wires 300, 308 and the retainer 320 may comprise a packaging unit. The packaging unit may be configured for distribution and delivery to a place for use of the guide wires 300, 308. The guide wires 300, 308 may be packaged following manufacture of the guide wires 300, 308 and may be inserted by hand into the retainer 320 as shown in FIGS. 44 and 45 following manufacture. The guide wires 300, 308 and the retainer 320 may accordingly be part of a packaging system. The increased flexibility of the proximal tip portions of the guide wires 300, 308 may be produced by grinding down the diameter of the respective portion of the proximal tip portions, which may include a tapered grind if desired.

The features of the proximal tip portions shown in FIG. 42 or 43 may be utilized with any embodiment of guide wire disclosed herein.

The embodiments of guide wires disclosed herein may have dimensions as desired. For example, an outer diameter dimension of the elongate wire may be 0.035 inches. In other embodiments, other outer diameter dimensions may be utilized.

Any of the guide wires disclosed herein may be coated for lubricity or for a hydrophilic effect. For example, any of the guide wires disclosed herein may be polytetrafluoroethylene (PTFE) coated if desired.

Although embodiments of guide wires and methods thereof are discussed here for mitral valve replacement, other uses may be provided. For example, the guide wires may be generally utilized to guide a delivery apparatus or other device to a desired location within a patient's body. In some embodiments, the guide wires may be generally utilized to guide a delivery apparatus or other device for transcatheter delivery, which may include transfemoral delivery or other forms of delivery (e.g., transjugular or transapical delivery). In some embodiments, the delivery apparatus may generally be used for transcatheter delivery of a prosthetic device, such as a prosthetic heart valve. The guide wires and methods disclosed herein may be utilized to deliver a tricuspid valve, or other form of valve as appropriate. In other embodiments, other devices may be delivered, such as a medical implant for use elsewhere in the body such as an artery, vein, or other body cavities or locations. The guide wires and methods disclosed herein may be utilized for transcatheter mitral valve repair as appropriate.

Features of embodiments may be modified, substituted, excluded, or combined. For example, the distal tips disclosed in regard to FIGS. 25-41 may be utilized as the distal tip of any embodiment of guide wire disclosed herein. The other features of the guide wires disclosed herein may be combined as desired.

In addition, the methods herein are not limited to the methods specifically described, and may include methods of utilizing the systems and apparatuses disclosed herein.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only, and is not intended to limit the scope of systems, apparatuses, and methods as disclosed herein, which is defined solely by the claims. Accordingly, the systems, apparatuses, and methods are not limited to that precisely as shown and described.

Certain embodiments of systems, apparatuses, and methods are described herein, including the best mode known to the inventors for carrying out the same. Of course, variations on these described embodiments will become apparent to those of ordinary skill in the art upon reading the foregoing description. The inventor expects skilled artisans to employ such variations as appropriate, and the inventors intend for the systems, apparatuses, and methods to be practiced otherwise than specifically described herein. Accordingly, the systems, apparatuses, and methods include all modifications and equivalents of the subject matter recited in the claims appended hereto as permitted by applicable law. Moreover, any combination of the above-described embodiments in all possible variations thereof is encompassed by the systems, apparatuses, and methods unless otherwise indicated herein or otherwise clearly contradicted by context.

Groupings of alternative embodiments, elements, or steps of the systems, apparatuses, and methods are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses an approximation that may vary, yet is capable of performing the desired operation or process discussed herein.

The terms "a," "an," "the" and similar referents used in the context of describing the systems, apparatuses, and methods (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the systems, apparatuses, and methods and does not pose a limitation on the scope of the systems, apparatuses, and methods otherwise claimed. No language in the present specification should be construed as indicating any non-claimed element essential to the practice of the systems, apparatuses, and methods.

All patents, patent publications, and other publications referenced and identified in the present specification are individually and expressly incorporated herein by reference in their entirety for the purpose of describing and disclosing, for example, the compositions and methodologies described in such publications that might be used in connection with the systems, apparatuses, and methods. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

What is claimed is:

1. A method comprising:
    passing a guide wire into an atrium of a patient's heart, the guide wire including an elongate wire and a distal tip coupled to the elongate wire;
    expanding the distal tip of the guide wire from an undeployed configuration to a deployed configuration in which the distal tip expands radially outward from the elongate wire in two radial dimensions of the elongate wire;
    passing the distal tip of the guide wire in the deployed configuration through an annulus of a native valve of the patient's heart;
    deflecting the elongate wire by contacting the distal tip of the guide wire in the deployed configuration against adjacent chordae tendineae of a ventricle of the patient's heart, the distal tip in the deployed configuration having a thickness in the two radial dimensions that is greater than a size of an opening between the adjacent chordae tendineae that are contacted such that the distal tip does not pass through the opening;
    passing a delivery apparatus retaining a device along the guide wire; and
    deploying the device to the native valve from the delivery apparatus.

2. The method of claim 1, further comprising passing the guide wire through an atrial septum of the patient's heart.

3. The method of claim 1, wherein the distal tip is configured to automatically move from the undeployed configuration to the deployed configuration.

4. The method of claim 1, wherein the distal tip in the deployed configuration forms a body bounding a volume.

5. The method of claim 1, wherein the distal tip in the deployed configuration includes one or more arms shaped into a body having a curved outer surface.

6. The method of claim 1, wherein the distal tip in the deployed configuration has one or more of a spiral, conical, lobed, spherical, ovoid, circular, or flat shape.

7. The method of claim 1, wherein the distal tip in the deployed configuration has a distal portion and a proximal portion, and the distal tip increases in size from the distal portion towards the proximal portion.

8. The method of claim 1, wherein the distal tip in the deployed configuration includes a single arm shaped into a body bounding a volume.

9. The method of claim 8, wherein the body includes alternating upward and downward oriented lobes.

10. The method of claim 1, wherein the delivery apparatus includes a capsule retaining the prosthetic valve and a nose cone positioned distal of the capsule, the nose cone being passed along the elongate wire of the guide wire.

11. A method comprising:
    providing a guide wire including an elongate wire and a distal tip coupled to the elongate wire;

expanding, within a portion of a patient's body, the distal tip of the guide wire from an undeployed configuration to a deployed configuration in which the distal tip expands radially outward from the elongate wire in two radial dimensions of the elongate wire;

passing the distal tip of the guide wire in the deployed configuration through an annulus of a native valve of the patient's heart;

deflecting the elongate wire by contacting the distal tip of the guide wire in the deployed configuration against adjacent chordae tendineae of a ventricle of the patient's heart, the distal tip in the deployed configuration having a thickness in the two radial dimensions that is greater than a size of an opening between the adjacent chordae tendineae that are contacted such that the distal tip does not pass through the opening;

passing a delivery apparatus retaining a device along the guide wire; and deploying the device to the native valve from the delivery apparatus.

12. The method of claim 11, further comprising passing the distal tip out of a lumen of a catheter within the portion of the patient's body to expand the distal tip from the undeployed configuration to the deployed configuration.

13. The method of claim 11, wherein the distal tip is preformed into the deployed configuration.

14. The method of claim 11, wherein the distal tip is made of a shape memory material.

15. The method of claim 11, wherein the distal tip in the deployed configuration has one or more of a spiral, conical, lobed, spherical, ovoid, circular, or flat shape.

16. The method of claim 11, wherein the distal tip in the deployed configuration forms a body bounding a volume.

17. The method of claim 16, wherein the body has a thickness in the two radial dimensions that is greater than a thickness of the elongate wire in the two radial dimensions.

18. The method of claim 11, wherein the distal tip in the deployed configuration includes a single arm shaped into a body bounding a volume.

19. The method of claim 18, wherein the body includes alternating upward and downward oriented lobes.

20. The method of claim 11, wherein the delivery apparatus includes a capsule retaining the device and a nose cone positioned distal of the capsule, the nose cone being passed along the elongate wire of the guide wire.

* * * * *